United States Patent
Mihara et al.

(10) Patent No.: US 10,267,275 B2
(45) Date of Patent: Apr. 23, 2019

(54) VALVE DEVICE FOR FUEL TANK

(71) Applicants: PIOLAX, INC., Yokohama-shi (JP); YACHIYO INDUSTRY CO., LTD., Sayama-shi (JP)

(72) Inventors: Kenta Mihara, Yokohama (JP); Kazunari Nakaya, Sakura (JP); Masato Shinozaki, Sakura (JP); Masaru Sawano, Sakura (JP)

(73) Assignees: PIOLAX, INC., Yokohama-Shi, Kanagawa (JP); YACHIYO INDUSTRY CO., LTD., Sayama-Shi, Saitama (JP)

( * ) Notice: Subject to any disclaimer, the term of this patent is extended or adjusted under 35 U.S.C. 154(b) by 607 days.

(21) Appl. No.: 14/639,054

(22) Filed: Mar. 4, 2015

(65) Prior Publication Data

US 2015/0252760 A1 Sep. 10, 2015

(30) Foreign Application Priority Data

Mar. 5, 2014 (JP) .................................. 2014-042614
Dec. 18, 2014 (JP) .................................. 2014-255891

(51) Int. Cl.
*F16K 24/04* (2006.01)
*F02M 37/20* (2006.01)
*B60K 15/035* (2006.01)

(52) U.S. Cl.
CPC ........... *F02M 37/20* (2013.01); *F16K 24/044* (2013.01); *B60K 15/03519* (2013.01); *Y10T 137/3099* (2015.04)

(58) Field of Classification Search
CPC .. F02M 37/20; F02M 37/017; F02M 37/0076; F16K 24/044; F16K 24/042; F16K 24/04; F16K 27/07; Y10T 137/3099; Y10T 137/0874; Y10T 137/053; Y10T 137/6004; Y10T 137/0753–137/0898;
(Continued)

(56) References Cited

U.S. PATENT DOCUMENTS 6,336,466 B1 * 1/2002 Ganachaud ...... B60K 15/03519
137/202
6,343,590 B1 * 2/2002 Nagai .............. B60K 15/03504
123/518

(Continued)

FOREIGN PATENT DOCUMENTS

JP 06-297968 A 10/1994

*Primary Examiner* — Craig J Price
(74) *Attorney, Agent, or Firm* — McGinn I.P. Law Group, PLLC.

(57) ABSTRACT

One embodiment provides a valve device for fuel tank. The valve device includes: a housing in which a valve chamber and a ventilation chamber are divided by a partition wall having a first and second openings; a vapor discharge outlet communicating with the ventilation chamber; first and second float valves vertically movably housed in the valve chamber to close the first and second openings, respectively; and a recess portion defined in a part of the ventilation chamber correspondingly with the first opening. A passage is provided to communicate the discharge outlet with the recess portion. And, a first wall portion is provided around an end of the passage on a side of the recess portion so as to block the fuel that flows out of the second opening into the first opening from heading to the third opening.

20 Claims, 23 Drawing Sheets

(58) Field of Classification Search
CPC .................. Y10T 137/7358–137/7668; Y10T 137/86324; Y10T 137/86332; B60K 15/03519; B60K 2015/03289; B60K 15/035; B60K 15/03504; F16L 47/02; F16L 47/14
USPC ....... 137/197, 198, 199, 202, 15.26, 315.08, 137/38–44, 409–454; 220/86.2, 745, 746; 141/59, 198, 202, 229; 123/516, 518, 123/198 D, 520
See application file for complete search history.

(56) References Cited

U.S. PATENT DOCUMENTS

| | | | | |
|---|---|---|---|---|
| 6,405,747 B1* | 6/2002 | King | ................ | B60K 15/03519 137/202 |
| 6,425,379 B2* | 7/2002 | Shimamura | ...... | B60K 15/03519 123/516 |
| 8,720,472 B2* | 5/2014 | Kito | ...................... | F16K 24/044 137/202 |
| 8,910,652 B2* | 12/2014 | Nemeth | ........... | B60K 15/03519 137/202 |
| 9,096,122 B2* | 8/2015 | Kaneko | ........... | B60K 15/03519 |
| 9,188,236 B2* | 11/2015 | Suzuki | .................. | F16K 24/044 |
| 2001/0054438 A1* | 12/2001 | Shimamura | ...... | B60K 15/03519 137/202 |
| 2005/0229967 A1* | 10/2005 | Ueki | .................... | F16K 24/044 137/2 |
| 2006/0011234 A1* | 1/2006 | Spink | .................... | F16K 24/044 137/202 |
| 2010/0071785 A1* | 3/2010 | Miura | ..................... | F16K 17/36 137/429 |
| 2010/0218748 A1* | 9/2010 | Arnalsteen | ........ | B60K 15/03519 123/516 |
| 2013/0160869 A1* | 6/2013 | Pifer | .................... | F16K 24/044 137/343 |
| 2013/0276912 A1* | 10/2013 | Kaneko | ........... | B60K 15/03519 137/430 |

* cited by examiner

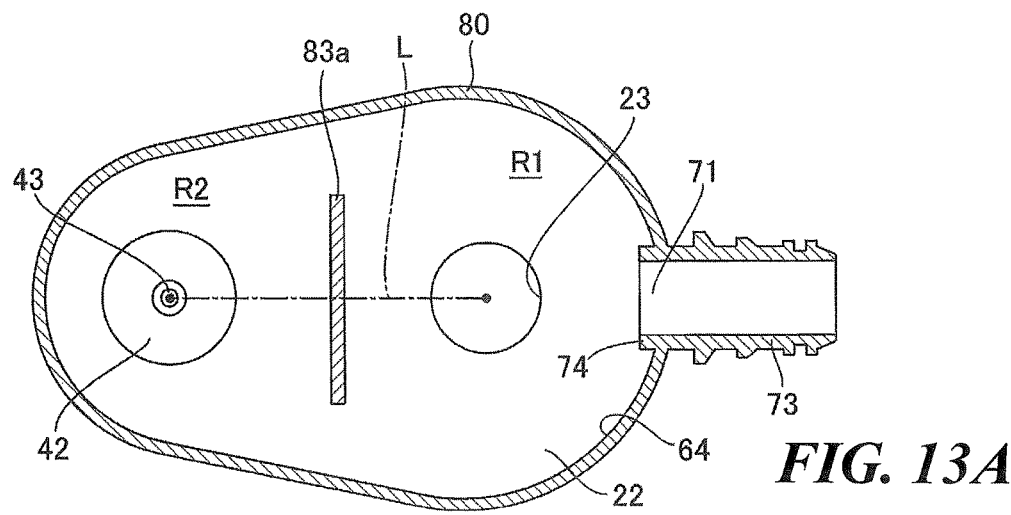
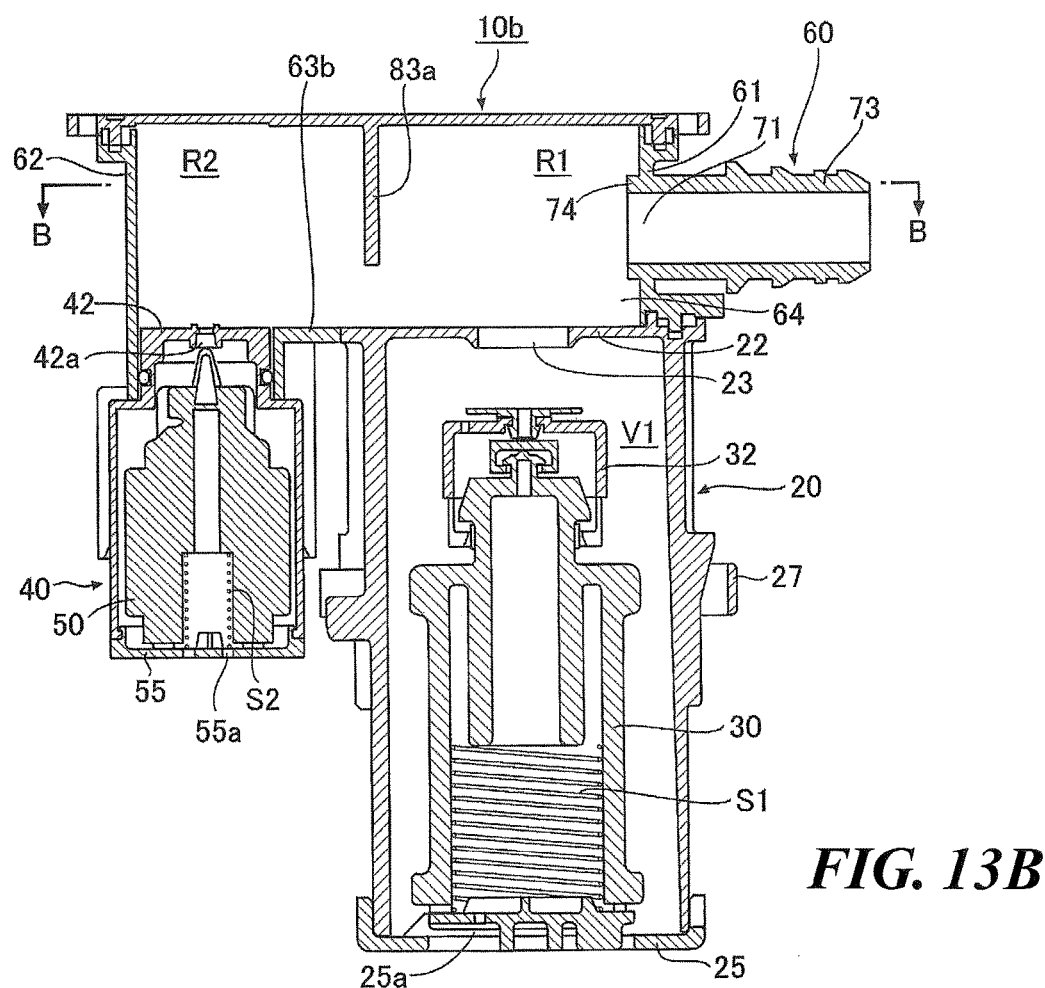
FIG. 13A
FIG. 13B

VALVE DEVICE FOR FUEL TANK

CROSS-REFERENCE TO RELATED APPLICATION(S)

This application claims priority from Japanese Patent Application No. 2014-042614 filed on Mar. 5, 2014 and Japanese Patent Application No. 2014-255891 filed on Dec. 18, 2014, the entire contents of which are incorporated herein by reference.

FIELD

Embodiments described herein generally relate to a valve device for fuel tank that is mounted on a fuel tank of an automobile or the like and includes an excess-feeding regulation valve and a fuel outflow preventive valve.

BACKGROUND

A fuel tank of an automobile includes an excess-feeding regulation valve for preventing fuel from being excessively fed in a fuel tank so that the fuel level in the fuel tank may not rise over a full fuel level, a fuel outflow preventive valve for preventing fuel in the fuel tank from leaking out of the fuel tank when the automobile turns or leans, and the like. While the valves are usually of separate construction, a valve device including both of the valves of a monolithic construction is also known.

For example, JP-H06-297968-A describes an evaporated fuel discharge regulating device for a fuel tank including a case that includes an end plate with first and second openings and a lower space and an upper space formed via the end plate, an evaporation fuel discharge pipe that is connected to an upper portion of the case and communicates with the upper space, a first float valve disposed in the lower space in a vertically movable manner and arranged to close the first opening when a fuel level in the fuel tank reaches near a full fuel level, a second float valve disposed in the lower space in a vertically movable manner and arranged to close the second opening when a fuel level in the fuel tank abnormally rises, and a relief valve disposed above the second opening and arranged to usually close the second opening and to open the second opening when the pressure in the fuel tank reaches a predetermined value or more.

When fuel is fed into the fuel tank and the fuel level reaches near the full fuel level, the first float valve closes the first opening to regulate the fuel so as not to be fed over the full fuel level. Meanwhile, when the fuel sways in the fuel tank, the first and second float valves rise to close the first and second openings to block the fuel flow to the evaporation fuel discharge pipe, which can prevent the fuel from flowing out of the fuel tank.

In the above-described evaporated fuel discharge regulating device, the second float valve for preventing fuel overflow moves toward and away from the second opening which is usually closed by the relief valve biased by a spring.

However, when the fuel greatly sways in the fuel tank, or a large amount of fuel droplets are spread because of vibration during travelling or the like, the fuel sometimes pushes up the relief valve against a biasing force of the spring, which ends up flowing into the upper space through the second opening. As a result, there arises a problem in that fuel in the form of liquid could flow into a discharging outlet communicating with the upper space of the evaporation fuel discharge pipe.

SUMMARY

One object of the present invention is to provide a valve device for fuel tank including an excess-feeding regulation valve and a fuel outflow preventive valve, the valve device being capable of preventing fuel from flowing into a fuel vapor discharge outlet even when the fuel sways to flow into a ventilation chamber.

An aspect of the present invention 1 provides a valve device for fuel tank, including: a housing in which a lower-side valve chamber and an upper-side ventilation chamber are divided by a partition wall, the partition wall including a first opening and a second opening through which the valve chamber and the ventilation chamber are communicated, respectively; a fuel vapor discharge outlet provided to communicate with the ventilation chamber; a first float valve vertically movably housed in the valve chamber to close the first opening when a fuel level in a fuel tank reaches near a full fuel level; a second float valve vertically movably housed in the valve chamber to close the second opening when the fuel level in the fuel tank abnormally rises; and a recess portion defined in a part of the ventilation chamber such that the first opening is provided on a bottom portion of the recess portion, wherein, in a plan view, a third opening functioning as the fuel vapor discharge outlet is positioned apart from the recess portion, wherein a passage extending to communicate the third opening with the recess portion is provided, and wherein a first wall portion extends from a ceiling wall inner surface of the ventilation chamber around an end of the passage on a side of the recess portion so as to block the fuel that flows out of the second opening into the first opening from heading to the third opening.

Based on the above-mentioned aspect, there may be provided the valve device, wherein a second wall portion extends from the ceiling wall inner surface of the ventilation chamber between the second opening and the third opening so as to block the fuel that flows out of the second opening from heading to the third opening.

Another aspect of the present invention provides a valve device for fuel tank, including: a housing in which a lower-side valve chamber and an upper-side ventilation chamber are divided by a partition wall, the partition wall including a first opening and a second opening through which the valve chamber and the ventilation chamber are communicated, respectively; a fuel vapor discharge outlet provided to an inner surface of the ventilation chamber; a first float valve vertically movably housed in the valve chamber to close the first opening when a fuel level in a fuel tank reaches near a full fuel level; and a second float valve vertically movably housed in the valve chamber to close the second opening when the fuel level in the fuel tank abnormally rises; wherein a rib extends from a ceiling wall inner surface of the ventilation chamber on a pathway heading from the second opening to the first opening so as to block the fuel that flows out of the second opening from heading to the fuel vapor discharge outlet.

Based on the above-mentioned aspect, there may be provided the valve device, wherein the first opening defines a recess portion at a position lower than the second opening, and wherein the rib is provided within an upper portion of the recess.

Based on the above-mentioned aspect, there may be provided the valve device, wherein the pathway is defined to connect a center of the second opening and a center of the first opening, and the fuel vapor discharge outlet is provided on an inner periphery of the ventilation chamber at one side of the pathway in a plan view, and wherein the rib goes away from the fuel vapor discharge outlet as it heads from the second opening to the first opening.

Based on the above-mentioned aspect, there may be provided the valve device, wherein the partition wall includes a shelf-shaped wall portion which extends from a periphery of the second opening to the recess portion, and the shelf-shaped wall portion includes a groove portion which extends from a side of the second opening to a side of the recess portion, and wherein the rib is ranging from a part of the ceiling wall inner surface corresponding to the shelf-shaped wall portion to another part of the ceiling wall inner surface corresponding to the recess portion so as to pass through between the fuel vapor discharge outlet and the groove portion on the part of the ceiling wall inner surface corresponding to the shelf-shaped wall portion.

Based on the above-mentioned aspect, there may be provided the valve device, wherein the shelf-shaped wall portion includes a rib insertion groove formed to receive the rib between the groove portion and the fuel vapor discharge outlet.

According to the aspect of the present invention, the first wall portion prevents the fuel that sways in the fuel tank and flows out of the second opening into the ventilation chamber to flow into the first opening from flowing into the passage to head to the third opening, so that the fuel can be prevented from flowing into a fuel vapor pipe communicating with the third opening that functions as the fuel vapor discharge outlet and communicating with a canister or the like.

According to the another aspect of the present invention, the rib provided on the pathway heading from the second opening to the first opening makes the fuel flow so as to avoid the fuel vapor discharge outlet when the fuel sways in the fuel tank and flows out of the second opening into the ventilation chamber to head to the first opening, so that the fuel can be prevented from flowing into a fuel vapor pipe communicating with the fuel vapor discharge outlet and communicating with a canister or the like.

BRIEF DESCRIPTION OF DRAWINGS

FIG. 3A is a perspective view of the cover, and FIG. 3B is a perspective view of the cover seen from a direction different from FIG. 3A.

FIG. 11B is a cross-sectional view of the valve device, and FIG. 11A is a cross-sectional view taken along the line A-A of FIG. 11B.

FIGS. 13A and 13B are views of a valve device for fuel tank according to the third embodiment, where FIG. 13B is a cross-sectional view of the valve device, and FIG. 13A is a cross-sectional view taken along the line B-B of FIG. 13B.

FIG. 16A is a perspective view of the cover, and FIG. 16B is a perspective view of the cover seen from a direction different from FIG. 16A.

DETAILED DESCRIPTION

First Embodiment

A valve device for fuel tank according to a first embodiment will be described with reference to FIGS. 1 to 10.

Figure 1:
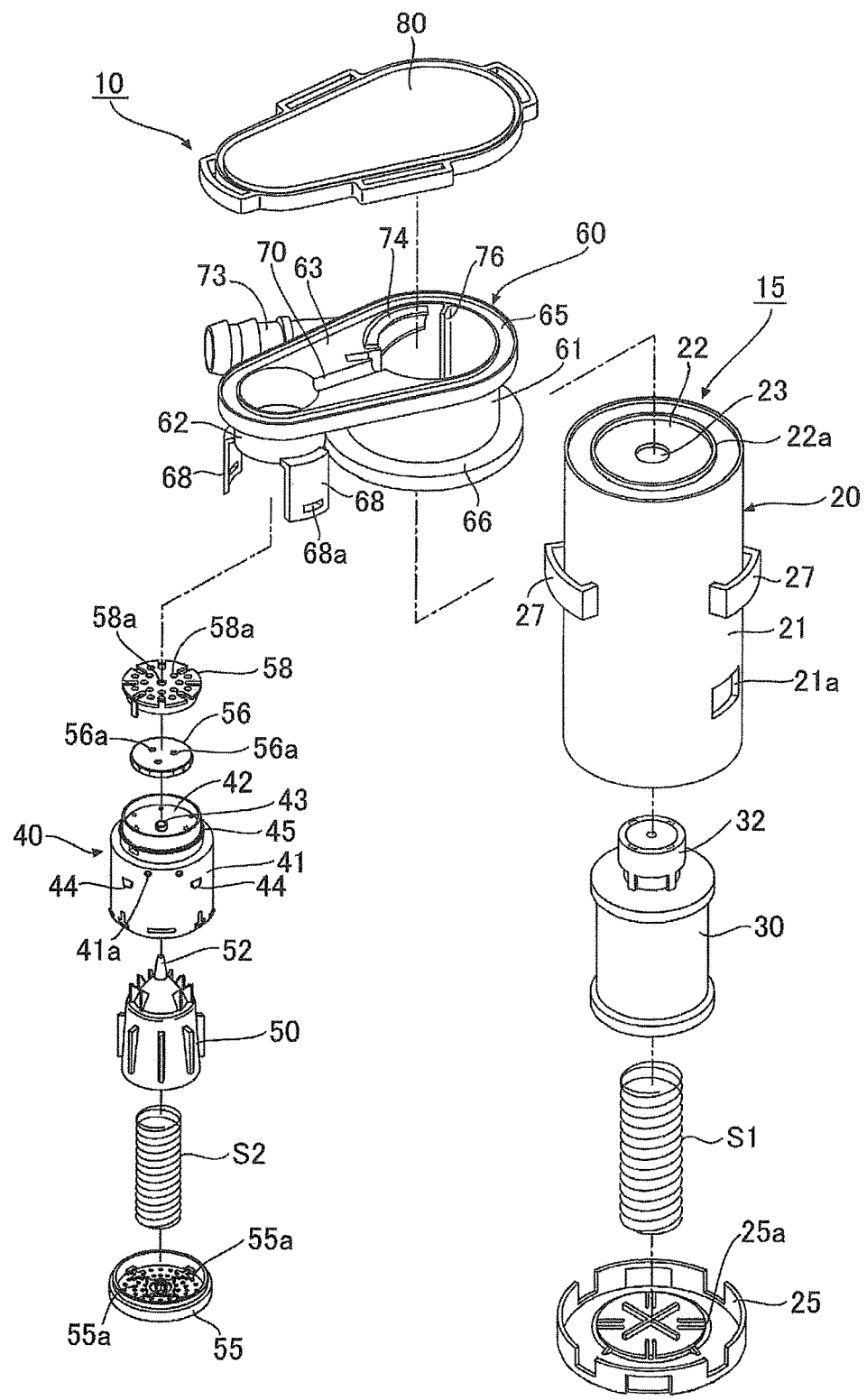
FIG. 1 is an exploded perspective view of a valve device for fuel tank according to the first embodiment.
Figure 2:
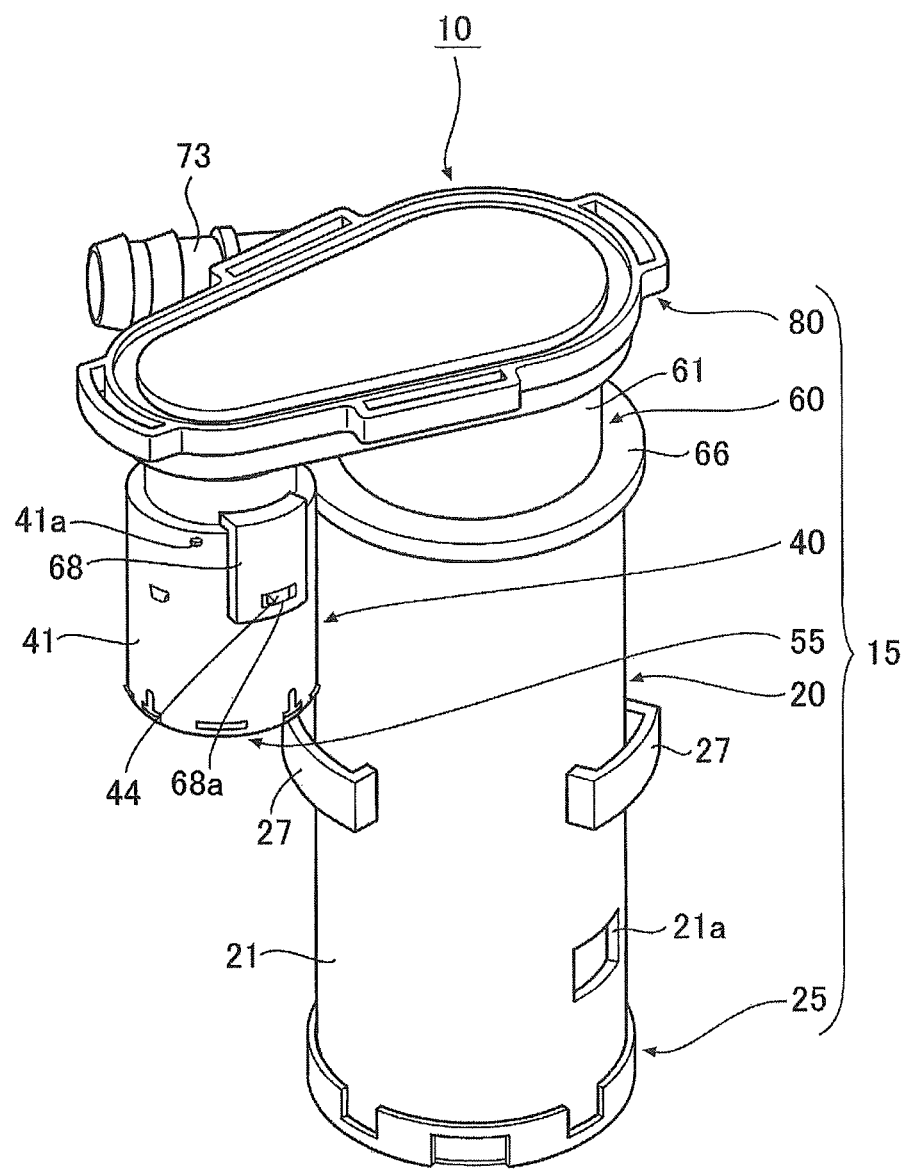
FIG. 2 is a perspective view of the valve device.

As shown in FIGS. 1 and 2, the valve device 10 for fuel tank (valve device 10) includes a housing 15 including a first casing 20 to house a first float valve 30, a first cap 25 attached to the lower side of the first casing 20, a second casing 40 to house a second float valve 50, a second cap 55 attached to the lower side of the second casing 40, a cover 60 attached to the upper sides of the first casing 20 and the second casing 40 to connect both the casings together, and a ceiling wall 80 attached to the upper side of the cover 60.

First, descriptions of the first casing 20 and the second casing 40, the first float valve 30 and the second float valve 50 housed therein, and the like will be provided.

The first casing 20 includes a cylindrical peripheral wall 21 of which the lower side is open. A first partition wall 22 having a first opening 23 is provided to the first casing 20 on the upper side. An annular wall 22a protrudes around the first opening 23 on the upper surface of the first partition wall 22. Plural mounting brackets 27 are provided at predetermined positions around the cylindrical peripheral wall 21 of the first casing 20. Engaging an engagement piece (not illustrated) provided to a fuel tank (not illustrated) with the mounting brackets 27 allows the first casing 20 to be mounted to the fuel tank. A through-hole 21a is provided to the peripheral wall 21 of the first casing 20.

The first cap 25 is attached to the opening of the first casing 20 on the lower side, which forms a first valve chamber V1 to house the first float valve 30 below the first partition wall 22 (see FIG. 8). A through-hole 25a is provided on the bottom surface of the first cap 25. The first valve chamber V1 communicates with the inside of the fuel tank by the through-hole 25a and the through-hole 21a.

The first float valve 30 is housed in the first valve chamber V1 in a vertically movable manner while sandwiching a first spring S1 between the first float valve 30 and the first cap 25.

Figure 8:
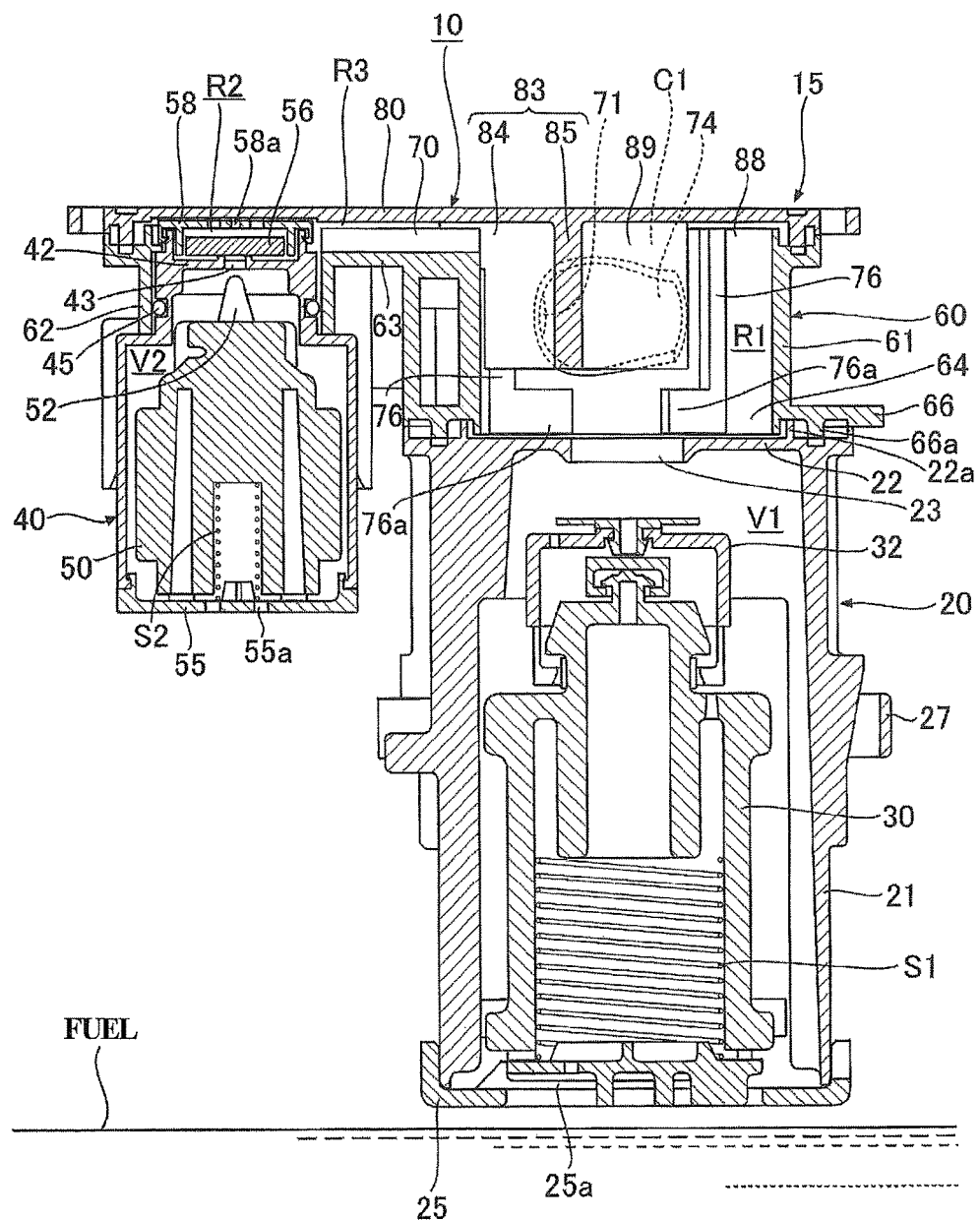
FIG. 8 is a cross-sectional view of the valve device where a first float valve and a second float valve descend.

A valve head 32 capable of swaying is attached to the upper side of the first float valve 30 (see FIG. 8).

The second casing 40 includes a cylindrical peripheral wall 41 of which the lower portion is increased in diameter than the upper portion. A sealing ring 45 is attached around the reduced-diameter upper portion of the second casing 40.

A second partition wall 42 having a second opening 43 is provided to the second casing 40 on the upper side. As shown in FIG. 8, the second partition wall 42 is disposed at a position higher than the first partition wall 22. The second casing 40 is reduced in diameter and shorter in length than the first casing 20. The second opening 43 includes a cylindrical portion protruding from the upper surface of the second partition wall 42. A notch (not illustrated) is provided to the protruding portion, and thereby the second opening 43 is not blocked completely in a state where a check valve 56 to be described later is in contact with the second opening 43 (see FIGS. 8 and 9).

The second cap 55 is attached to the opening of the second casing 40 on the lower side, which forms a second valve chamber V2 to house the second float valve 50 below the second partition wall 42 (see FIG. 8). A through-hole 55a is provided on the bottom surface of the second cap 55.

Plural engagement pawls 44 protrude from the outer periphery of the cylindrical peripheral wall 41 of the second casing 40. A through-hole 41a communicating with the second valve chamber V2 is provided on the cylindrical peripheral wall 41 of the second casing 40.

The second float valve 50 is housed in the second valve chamber V2 in a vertically movable manner while sandwiching a second spring S2 between the second float valve 50 and the second cap 55. A valve head 52 is provided to the second float valve 50 on the upper side.

As shown in FIG. 8, in the state of not being immersed in fuel, the first float valve 30 and the second float valve 50 compress the springs S1 and S2 by their own weights to be placed on the caps 25 and 55 while the first opening 23 and the second opening 43 are kept open.

"Fuel" means liquid fuel (including fuel droplets), and "fuel vapor" means evaporated fuel.

Figure 9:
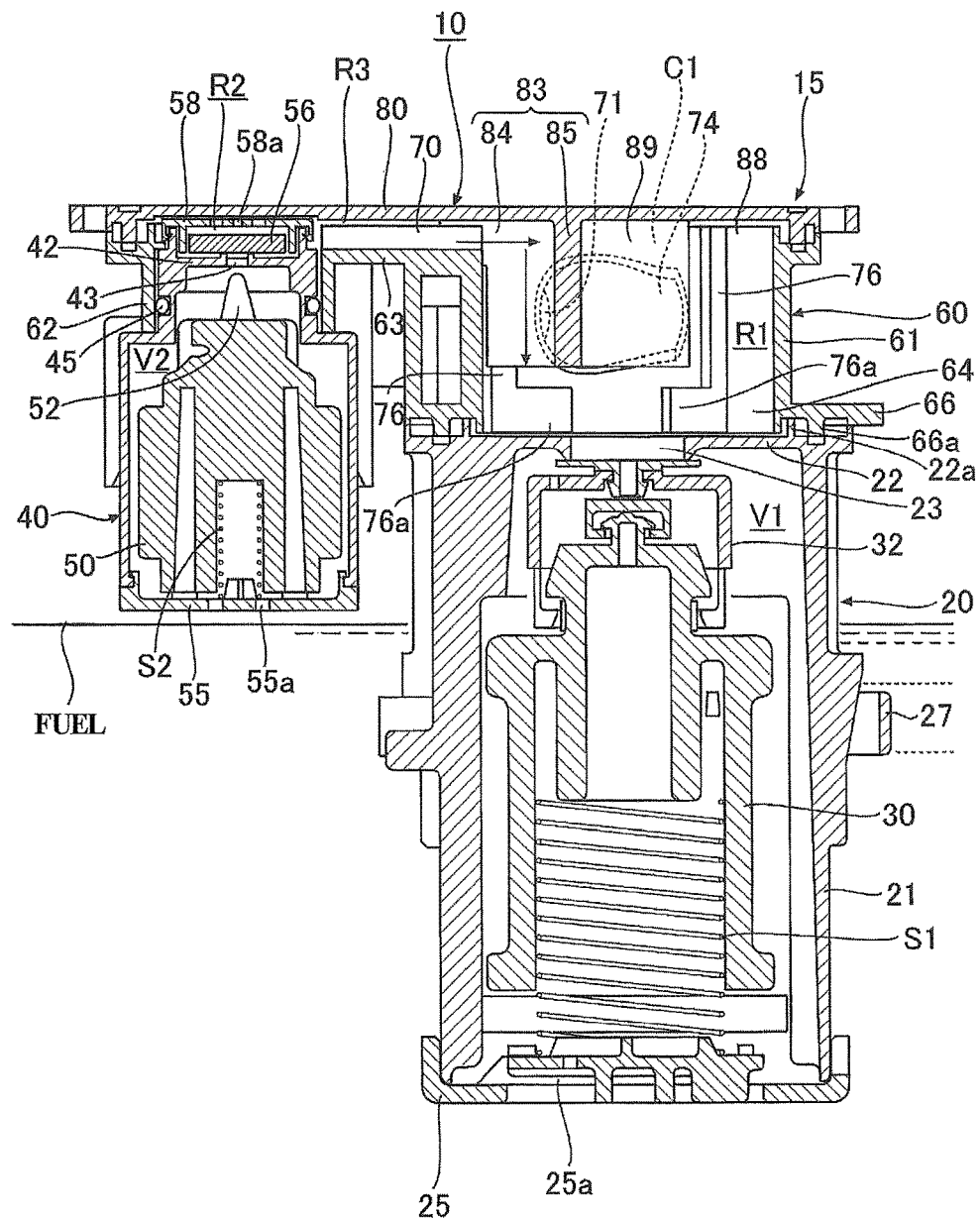
FIG. 9 is a cross-sectional view of the valve device where the first float valve ascends.
Figure 10:
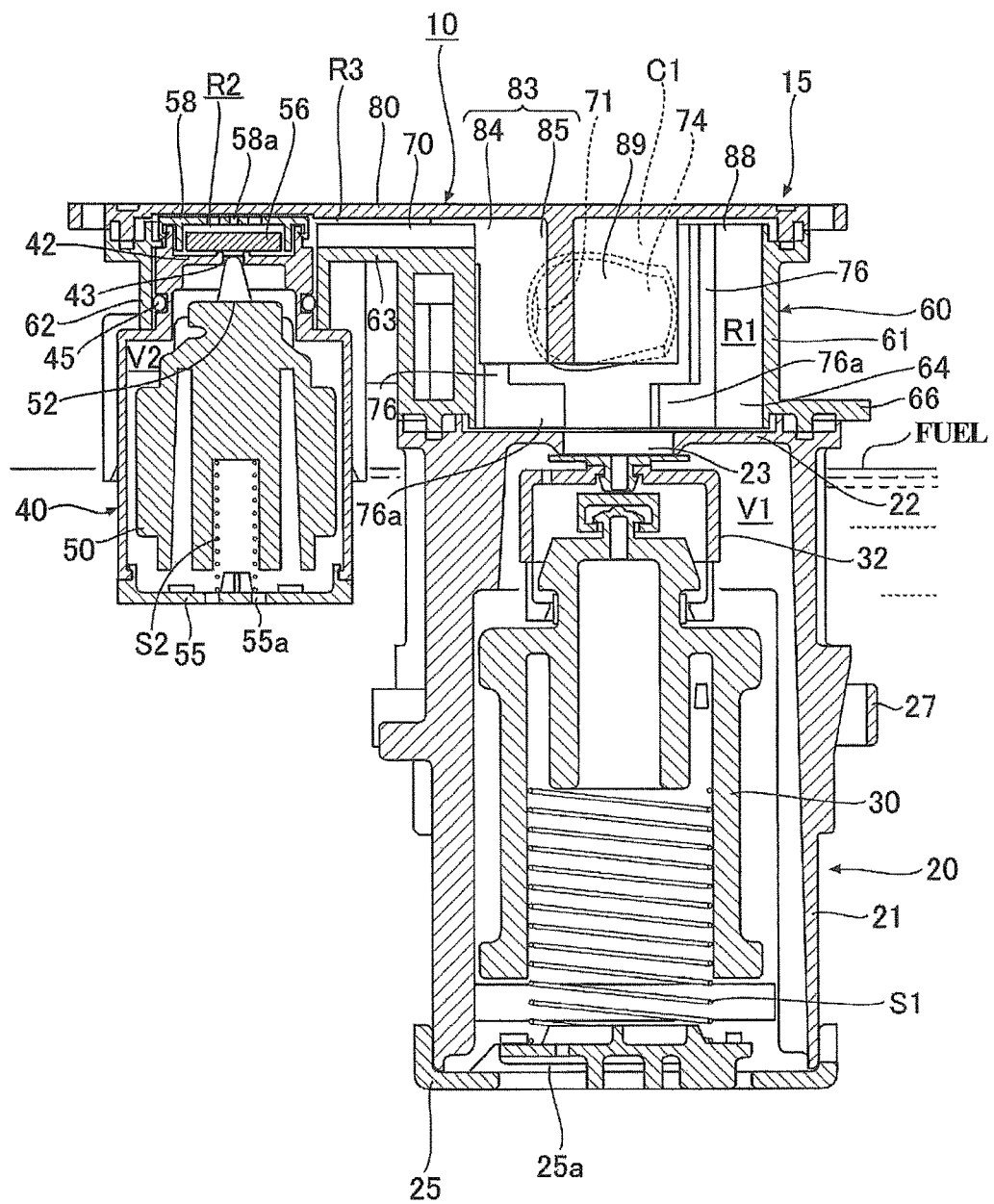
FIG. 10 is a cross-sectional view of the valve device where the first float valve and second float valve ascend.

When the fuel level in the fuel tank rises to immerse the first float valve 30 and the second float valve 50 in the fuel in the above-described state, the first float valve 30 and the second float valve 50 are made to ascend by the biasing force of the springs S1 and S2 and by the buoyant force of the first float valve 30 and the second float valve 50 themselves (see FIGS. 9 and 10).

Then, the first float valve 30, when the fuel level in the fuel tank reaches a full fuel level, closes the first opening 23 and functions as an excess-feeding regulation valve for preventing fuel from being excessively fed over the full fuel level. The second float valve 50, when the fuel level in the fuel tank abnormally rises because of sway of the fuel or the like, closes the second opening 43 and functions as a fuel outflow preventive valve for preventing the fuel from leaking outside.

A lid body 58 having plural through-holes 58a is attached to the reduced-diameter upper portion of the peripheral wall 41 of the second casing 40. The disk-shaped check valve 56 having plural through-holes 56a is housed inside of the lid body 58 above the second partition wall 42.

The check valve 56 is arranged to, when the pressure in the fuel tank falls in a state where the first opening 23 is closed by the first float valve 30, flow air into the fuel tank through the through-holes 58a of the lid body 58, the through-holes 56a of the check valve 56, and the notch (not illustrated) of the second opening 43, while arranged to, when the pressure in the fuel tank increases, ascend to open the second opening 43 to discharge fuel vapor out of the fuel tank.

Next, descriptions of the cover 60 attached to the upper sides of the first casing 20 and the second casing 40 to connect and unite both the casings together, and the ceiling wall 80 attached to the upper side of the cover 60 will be provided.

Figure 3A:
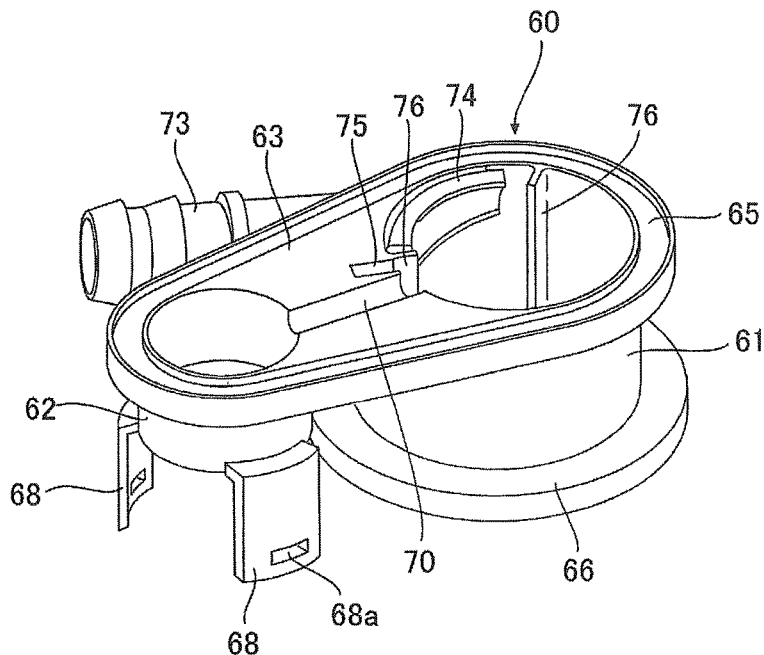
FIGS. 3A and 3B are views of a cover, where
Figure 3B:
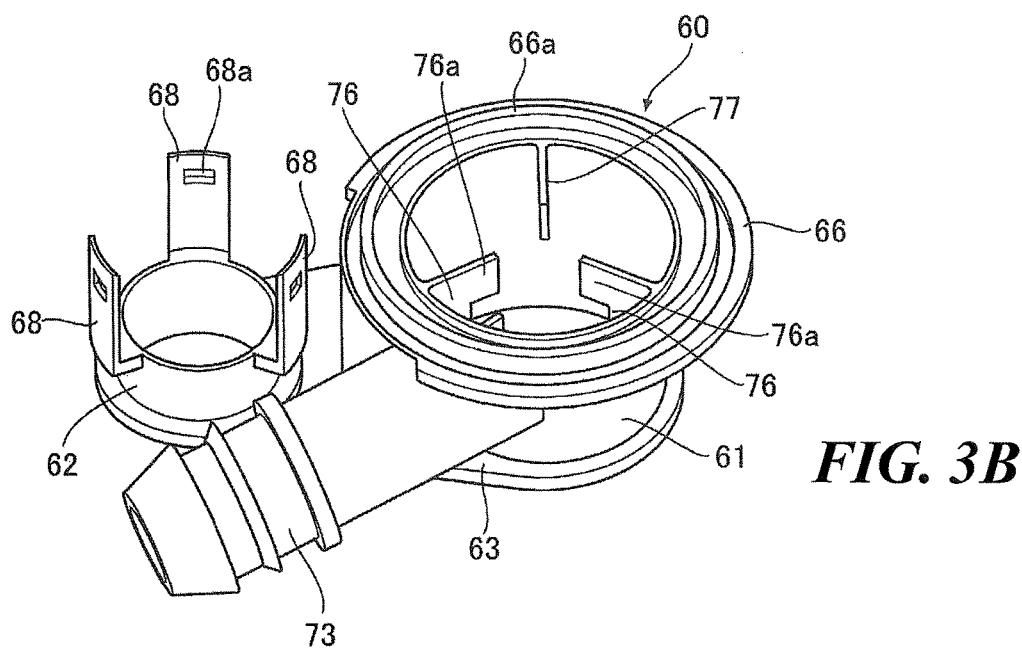

As shown in FIGS. 3A and 3B, the cover 60 includes a first cylinder portion 61 having an approximately cylindrical shape, a second cylinder portion 62 also having an approximately cylindrical shape, and a shelf-shaped wall portion 63 disposed between to connect the first cylinder portion 61 and the second cylinder portion 62 together. The first cylinder portion 61 is increased in diameter and extends longer downward than the second cylinder portion 62.

The reduced-diameter upper portion of the cylindrical peripheral wall 41 of the second casing 40 is inserted into the second cylinder portion 62. The second partition wall 42 having the second opening 43 is disposed on the inner periphery of the second cylinder portion 62 on the upper end side (see FIG. 8).

The upper portion of the cylindrical peripheral wall 21 of the first casing 20 is attached to the lower side of the first cylinder portion 61. The first partition wall 22 having the first opening 23 is disposed at the opening of the first cylinder portion 61 on the lower end side. A recess portion 64 lower than the shelf-shaped wall portion 63 is provided around the first opening 23 (see FIG. 8). To be specific, the recess portion 64 forms a portion of a ventilation chamber while the first opening 23 is provided to the bottom portion of the recess portion 64 and lower than the shelf-shaped wall portion 63.

Figure 5:
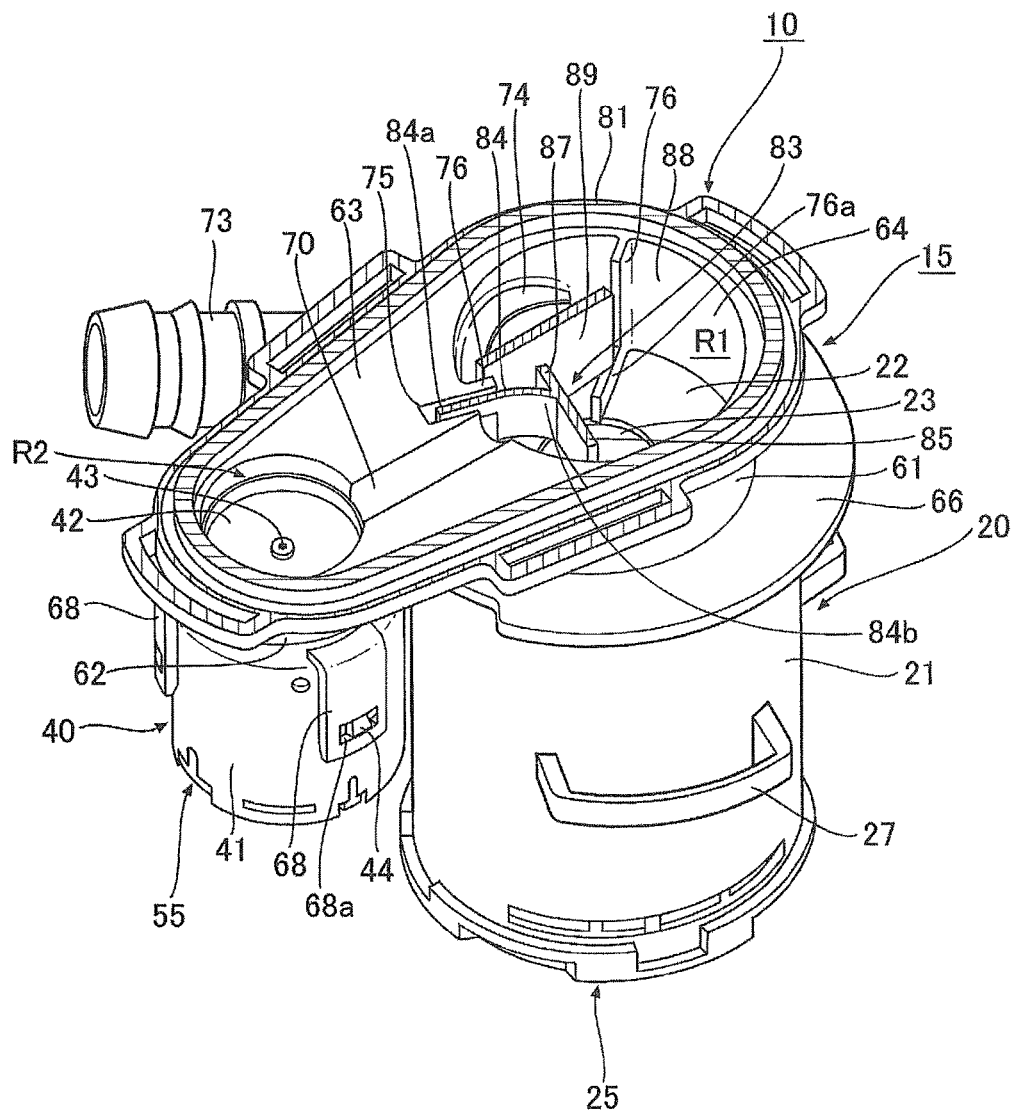
FIG. 5 is a perspective view of the ceiling wall, a portion of which is broken.
Figure 6:
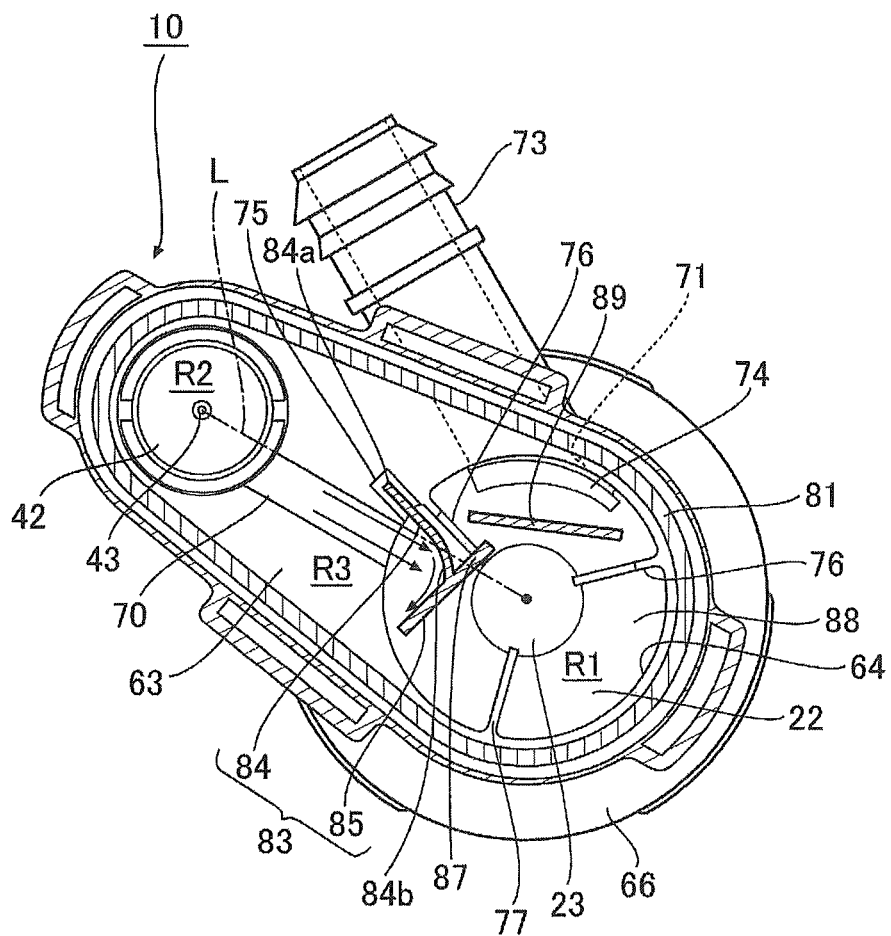
FIG. 6 is a plan view of the ceiling wall, a portion of which is broken.

The shelf-shaped wall portion 63 extends from the circumference of the second opening 43 of the second partition wall 42 on the side of the second cylinder portion 62 to the inner periphery of the recess portion 64 provided around the first opening 23 of the first partition wall 22 on the side of the first cylinder portion 61 (see FIGS. 5 and 6). A clearance R3 is provided between the shelf-shaped wall portion 63 and the ceiling wall 80 attached to the upper side of the cover 60 (see FIG. 9). A welding groove 65 is provided around the first cylinder portion 61 and the second cylinder portion 62 on the upper sides and around the shelf-shaped wall portion 63 (see FIG. 3A).

A flange portion 66 extends from the outer circumference of the lower end of the first cylinder portion 61 as shown in FIG. 3A, and an annular welding protruding portion 66a protrudes from the circumference of the first cylinder portion 61 on the back side (see FIG. 3B). By placing the flange portion 66 above the cylindrical peripheral wall 21 of the first casing 20 and placing the annular welding protruding portion 66a around the annular wall 22a of the first partition wall 22 to weld the annular welding protruding portion 66a to the upper surface of the first partition wall 22, the first casing 20 can be connected with the cover 60 (see FIG. 8).

Plural engagement pieces 68 including an engagement hole 68a extend downward from the outer periphery of the second cylinder portion 62. By inserting the reduced-diameter upper portion of the cylindrical peripheral wall 41 of the second casing 40 into the second cylinder portion 62 to engage the engagement pawls 44 with the engagement holes 68a of the engagement pieces 68, the second casing 40 can be airtightly connected with the cover 60 via the sealing ring 45 (see FIG. 8).

A method for connecting the casings 20 and 40 with the cover 60 is not limited to the above-described method.

Connecting the cover 60 with the casings 20 and 40 as described above covers the openings of the cylinder portions 61 and 62 on the lower sides with the partition walls 22 and 42. Attaching the ceiling wall 80 to the upper side of the cover 60 covers the openings of the cylinder portions 61 and 62 on the upper sides and also covers the shelf-shaped wall portion 63 on the upper side.

Thus, a first ventilation chamber R1 disposed above the first valve chamber V1 in the first cylinder portion 61, a second ventilation chamber R2 disposed above the second valve chamber V2 in the second cylinder portion 62, and the clearance R3 connecting with the first ventilation chamber R1 and the second ventilation chamber R2 function as the "ventilation chamber". In the present embodiment, the first valve chamber V1 and the second valve chamber V2 are disposed side by side (abreast) as shown in FIG. 8.

Attaching the cover 60 to the casings 20 and 40 as described above disposes the shelf-shaped wall portion 63 between the first partition wall 22 of the first casing 20 and the second partition wall 42 of the second casing 40 as shown in FIG. 6. In the present embodiment, the first partition wall 22, the second partition wall 42, and the shelf-shaped wall portion 63 function as the "partition wall".

A groove portion 70 extending from the side of the second opening 43 of the second partition wall 42 so as to communicate with the inner periphery of the recess portion 64 of the first opening 23 is provided on the upper surface of the shelf-shaped wall portion 63 as shown in FIGS. 3A, 5, and 6. The groove portion 70 has its one end communicating with the first ventilation chamber R1, the other end communicating with the second ventilation chamber R2, and its upper portion communicating with the clearance R3.

As shown in FIG. 6, in a plan view (when seen in a direction facing the partition wall), the groove portion 70 is disposed on the opposite side of a fuel vapor discharge outlet 71 to be described later with respect to a pathway L heading from the second opening 43 to the first opening 23 (i.e., a pathway heading from the center of the second opening 43 to the center of the first opening 23), and formed linear so as to be approximately parallel to the pathway L. The inner periphery of the groove portion 70 is curved (see FIG. 7). The shape of the groove portion 70 is not limited to this shape, and plural groove portions 70 may be provided so as to head from the second opening 43 to the first opening 23.

In a state where a predetermined amount of fuel is stored in the fuel tank and the first float valve 30 functioning as an excess-feeding regulation valve rises to close the first opening 23, the fuel vapor, air, or the like in the fuel tank mainly passes through the second valve chamber V2, the second opening 43, the second ventilation chamber R2, the groove portion 70, and the clearance R3 in succession to flow into the first ventilation chamber R1. This flow path is called an evaporation line. The groove portion 70 constitutes a part of the evaporation line.

Figure 7:
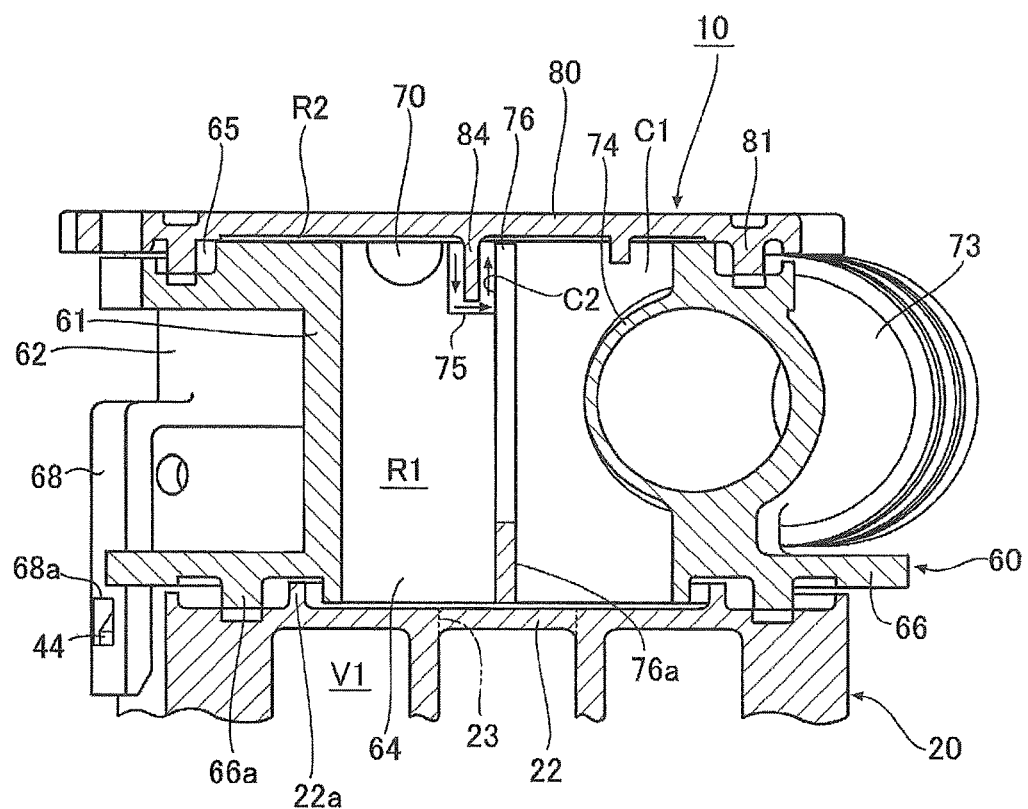
FIG. 7 is an enlarged cross-sectional view of relevant components of the valve device.

As shown in FIGS. 6 to 8, the fuel vapor discharge outlet 71 (discharge outlet 71) communicating with the first ventilation chamber R1 is disposed on the inner surface of the ventilation chamber, for example, at a predetermined position on the inner periphery of the recess portion 64 in the first cylinder portion 61 in the present embodiment. To be specific, the fuel vapor discharge outlet is disposed so as to communicate with the ventilation chamber in the present valve device 10. The discharge outlet 71 in the present embodiment is disposed on the opposite side of the groove portion 70 with respect to the pathway L (see FIG. 6). The position where the discharge outlet 71 is disposed is not specifically limited.

A fuel vapor pipe 73 (pipe 73) used for connection with a pipe outside of the fuel tank is connected with the outer periphery of the first cylinder portion 61 at an acute angle with respect to the pathway L so as to communicate with the discharge outlet 71 and the first ventilation chamber R1. The position where the pipe 73 is connected is not specifically limited, and the pipe 73 may be disposed at a right angle with respect to the pathway L.

As shown in FIGS. 3A, 6, 7, and 8, a cylindrical wall 74 surrounding the discharge outlet 71 protrudes from the inner periphery of the first cylinder portion 61, and a clearance C1 is formed between the outer periphery of the cylindrical wall 74 and the inner periphery of the ceiling wall 80 (see FIG. 7).

As shown in FIGS. 3A and 5 to 7, a rib insertion groove 75 is provided between the groove portion 70 and the discharge outlet 71 on the upper surface of the shelf-shaped wall portion 63. The rib insertion groove 75 has its upper portion communicating with the clearance R3 and its one end communicating with the first ventilation chamber R1, and forms a predetermined angle with respect to the groove portion 70 (see FIGS. 5 and 6). The shape, the angle to be disposed at, and the like of the rib insertion groove 75 are not limited specifically if the rib insertion groove 75 is disposed between the groove portion 70 and the discharge outlet 71.

As shown in FIGS. 3A and 5 to 8, a pair of vertical ribs 76 and 76 extending in an up/down direction of the first ventilation chamber R1 are provided on both the sides of the cylindrical wall 74 in the circumferential direction on the inner periphery of the first cylinder portion 61. The vertical ribs 76 include a lower end portion 76a having the shape of the letter L extending in the inner diameter direction of the first ventilation chamber R1 (see FIGS. 5 and 8). The distal ends of the lower end portions 76a extend so as to protrude toward the inner diameter side than the inner circumference of the opening 23 of the partition wall 22 (see FIG. 6). As shown in FIGS. 3B and 6, a lateral rib 77 is provided at regular intervals with respect to the ribs 76 and 76 and extends from the inner periphery of the lower end of the first cylinder portion 61 in the inner diameter direction of the first ventilation chamber R1. The distal end of the lateral rib 77 protrudes toward the inner diameter side than the inner circumference of the opening 23.

Figure 4:
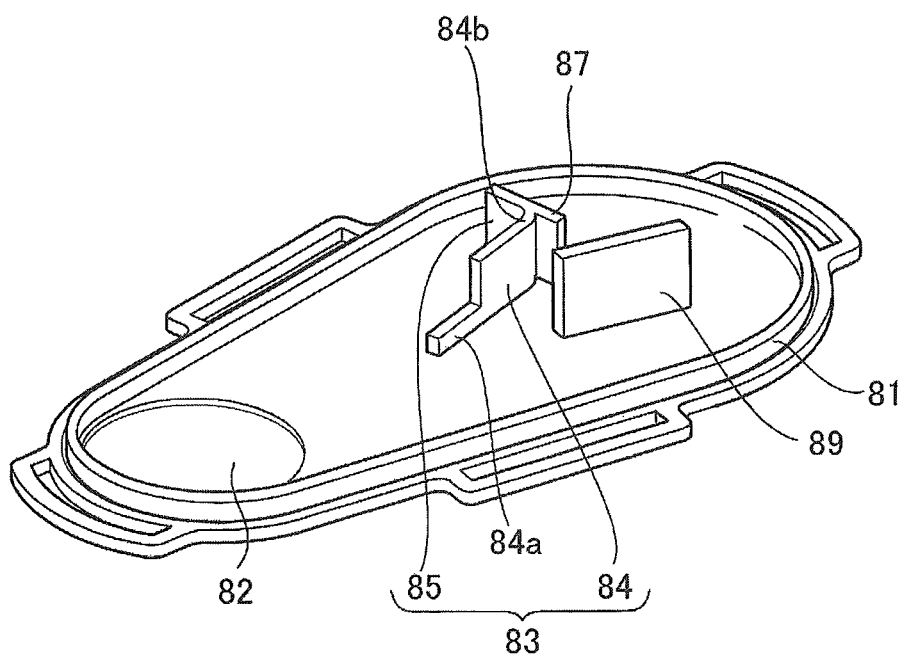
FIG. 4 is a perspective view of a ceiling wall.

The ceiling wall 80 attached to the upper side of the cover 60 described above has a long plate shape that conforms to the opening of the cover 60 on the upper surface as shown in FIGS. 1 and 4. An annular welding protruding portion 81 protrudes from the inner surface circumference of the ceiling wall 80. Inserting and welding the welding protruding portion 81 into the welding groove 65 on the upper surface of the cover 60 attaches the ceiling wall 80 to the upper side of the cover 60. A method for attaching the ceiling wall 80 to the cover 60 is not limited to the above-described method.

A circular recess portion 82 for preventing interference with the lid body 58 attached to the upper side of the second casing 40 is provided at one end on the inner surface of the ceiling wall 80 on the side of the second casing 40.

As shown in FIGS. 5 and 6, a rib 83 extending from a ceiling wall inner surface of the ventilation chamber is provided on the pathway L heading from the second opening 43 to the first opening 23 so as to block the fuel flowing out of the second opening 43 from heading to the discharge outlet 71. The rib 83 is disposed mainly above the recess portion 64 around the first opening 23, and has the shape of heading from the second opening 43 to the first opening 23 and extending in a direction away from the discharge outlet 71.

To be specific, the rib 83 according to the present embodiment includes a first rib 84 and a second rib 85 as shown in FIGS. 4 to 6. The first rib 84 is provided ranging from the ceiling wall 80 on the side of the shelf-shaped wall portion 63 to the ceiling wall 80 on the side of the recess portion 64 around the first opening 23, and passes between the discharge outlet 71 and the groove portion 70 on the ceiling wall 80 on the side of the shelf-shaped wall portion 63. The first rib 84 has a plate shape of the approximate letter L and stands lower at the base end and higher at the other portion (see FIG. 4), and includes a base end 84a lower than the other portion and inserted into the rib insertion groove 75, and a distal end 84b having a bent round shape so as to be away from the discharge outlet 71.

The second rib 85 extends linearly approximately perpendicular to the first rib 84. An extension rib 87 having the same width as the second rib 85 extends from one end of the second rib 85 to the discharge outlet 71. A cover wall 89 having a long plate shape to be disposed on the opening side of the cylindrical wall 74 is suspended at a position spaced a predetermined clearance from the extension rib 87 and at a position inclined a predetermined angle with respect to the first rib 84. The shape of the cover wall 89 is not limited, and may be not provided.

In a state where the ceiling wall 80 is attached to the upper side of the cover 60, the rib 83 having the above-described configuration is disposed such that the base end 84a of the first rib 84 is inserted into the rib insertion groove 75 while the rib 83 passes between the groove portion 70 and the discharge outlet 71 on the ceiling wall 80 disposed on the shelf-shaped wall portion 63 and covers the opening of the groove portion 70 on the side of the first ventilation chamber R1, as shown in FIGS. 5 and 6. In addition, the cover wall 89 is disposed on the opening side of the cylindrical wall 74.

As a result, the fuel that flows into the first ventilation chamber R1 through the second valve chamber V2, the second opening 43, the second ventilation chamber R2, and the groove portion 70 is made to flow in a direction away from the discharge outlet 71 so as to avoid the discharge outlet 71 by the rib 83 as indicated with the arrows in FIGS. 6 and 9.

In a state where the base end 84a of the first rib 84 is inserted into the rib insertion groove 75, a clearance C2 having a concave shape is formed between the first rib 84 and the inner surface of the rib insertion groove 75 as shown in FIG. 7.

The rib is not limited specifically, and may, in addition to heading from the second opening 43 to the first opening 23, have the simple shape of extending linearly so as to be away from the discharge outlet 71, the shape of extending perpendicularly into the approximate letter L, the shape of being bent into the letter V, the shape of being bent into the letter U, an arc shape, a curved shape, or the like.

The air and fuel vapor in the fuel tank that are discharged out of the fuel tank when feeding fuel into the fuel tank mainly flow into the first ventilation chamber R1 through the first valve chamber V1 and the first opening 23, further flow out of the discharge outlet 71 into the pipe 73, and are discharged into a canister or the like connected with the pipe 73. This flow path is called a vent line.

Next, the operation and effect of the valve device 10 of the first embodiment will be described.

As shown in FIG. 8, the first opening 23 and the second opening 43 are open in a state where fuel is not sufficiently fed in the fuel tank and the first float valve 30 and the second float valve 50 are not immersed in fuel.

When fuel is fed in the fuel tank in this state, the air and fuel vapor in the fuel tank are discharged into the canister or the like outside of the fuel tank through the vent line (the first valve chamber V1, the first opening 23, the first ventilation chamber R1, the discharge outlet 71, and the pipe 73).

Then, when fuel is fed in the fuel tank and the fuel level in the fuel tank rises, the fuel flows into the first valve chamber V1 through the through-hole 25a of the first cap 25 and the through-hole 21a of the first casing 20. When immersed in fuel over a predetermined fuel height, the first float valve 30 floats by the buoyant force of the first spring S1 and the first float valve 30 itself. Thus, the valve head 32 closes the first opening 23 of the first partition wall 22 as shown in FIG. 9, so that the discharge amount of the air and fuel vapor in the fuel tank is reduced, which can prevent fuel from being fed any more.

When the automobile turns or leans greatly to raise the fuel level in the fuel tank, the fuel flows into the second valve chamber V2 through the through-hole 55a of the second cap 55 and the through-hole 41a of the second casing 40. When immersed in fuel over a predetermined fuel height, the second float valve 50 floats by the buoyant force of the second spring S2 and the second float valve 50 itself. Thus, the valve head 52 closes the second opening 43 of the second partition wall 42 as shown in FIG. 10, so that the fuel is blocked from flowing into the second ventilation chamber R2 through the second opening 43, which can prevent the fuel from leaking out of the fuel tank.

When the automobile runs on rough roads to vibrate up and down or sway side by side or makes a sharp turn, the fuel or fuel droplets could vigorously flow into the second ventilation chamber R2 through the second opening 43. The fuel that flows into the second ventilation chamber R2 flows into the first ventilation chamber R1 through the clearance R3 on the shelf-shaped wall portion 63.

At this time, because the valve device 10 includes the groove portion 70 on the shelf-shaped wall portion 63, the fuel intensively flows through the groove portion 70 to flow into the first ventilation chamber R1. Because the rib 83 is provided on the pathway L heading from the second opening 43 to the first opening 23 so as to block the fuel that flows out of the second opening 43 from heading to the discharge outlet 71, the fuel that flows into the first ventilation chamber R1 is guided to flow in the direction away from the discharge outlet 71 so as to avoid the discharge outlet 71 by the rib 83, and falls along the rib 83 onto the side of the recess portion 64 around the first opening 23 (FIGS. 6 and 9). Then, the fuel flows into the first valve chamber V1 through the first opening 23 to return to the fuel tank through the through-hole 25a of the first cap 25 and the like. Consequently, the fuel flowing into the first ventilation chamber R1 does not easily flow into the discharge outlet 71, and can be prevented from flowing into the pipe 73.

In the present embodiment, because the rib 83 is disposed above the recess portion 64 around the first opening 23, the fuel that is blocked from flowing by the rib 83 can be made to easily fall more onto the side of the recess portion 64 around the first opening 23.

Having the configuration of heading from the second opening 43 to the first opening 23 and extending in the direction away from the discharge outlet 71, the rib 83 can guide the fuel to the opening 23, the fuel flowing along the pathway L (see FIG. 6) heading from the second opening 43 to the first opening 23, while making the fuel flow in the direction away from the discharge outlet 71. Thus, the fuel can be made not to easily flow into the discharge outlet 71.

The groove portion 70 is provided on the shelf-shaped wall portion 63, and the rib 83 is provided ranging from the ceiling wall 80 on the side of the shelf-shaped wall portion 63 to the ceiling wall 80 on the side of the recess portion 64 around the first opening 23, and passes between the discharge outlet 71 and the groove portion 70 on the ceiling wall 80 on the side of the shelf-shaped wall portion 63. Thus, the fuel flowing out of the second opening 43 into the second ventilation chamber R2 can be made to easily travel to the first opening 23 through the groove portion 70, and made to travel so as to be away from the discharge outlet 71 (see the arrows in FIG. 6) while guided by the rib 83 passing between the groove portion 70 and the discharge outlet 71, which can more effectively prevent the fuel from flowing into the pipe 73.

The rib insertion groove 75 is provided between the groove portion 70 and the discharge outlet 71 on the shelf-shaped wall portion 63, and the base end 84a of the rib 83 flows into the rib insertion groove 75 to form the clearance C2 having a concave shape between the first rib 84 and the inner surface of the rib insertion groove 75. Thus, the fuel flowing out of the second opening 43 into the first ventilation chamber R1 to flow toward the first opening 23 on the shelf-shaped wall portion 63 needs to flow through the clearance C2 in order to reach the discharge outlet 71 as indicated by the arrows in FIG. 7, which can effectively block the fuel from flowing over the rib 83, and can more effectively prevent the fuel from flowing into the discharge outlet 71.

Having a bent round shape, the distal end 84b of the first rib 84 of the rib 83 can smoothly guide the fuel to the first opening 23. Further, the first rib 84 and the second rib 85 are consecutively provided, the entire rib 83 can be strengthened. Providing the second rib 85 covers the opening of the groove portion 70 on the side of the first ventilation chamber R1, so that the fuel flowing out of the groove portion 70 into the first ventilation chamber R1 can be covered more extensively, which can make the fuel not easily flow into the discharge outlet 71.

Second Embodiment

Figure 11A:
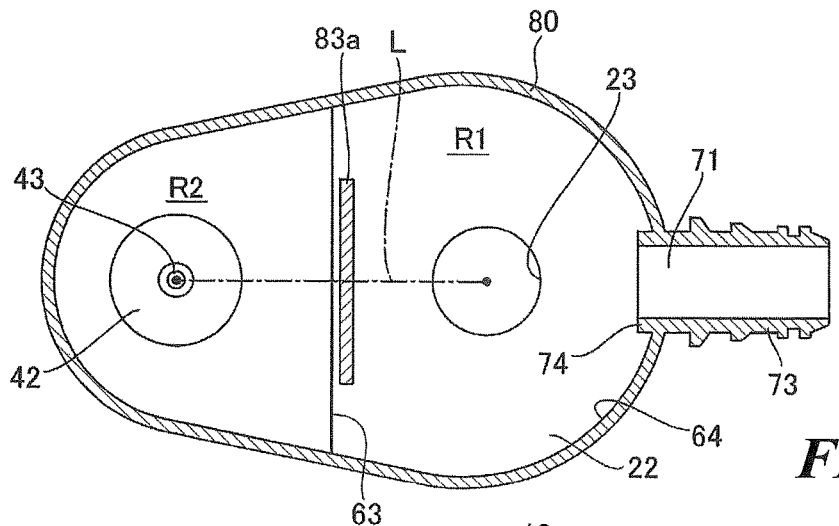
FIGS. 11A and 11B are views of a valve device for fuel tank according to the second embodiment, where
Figure 11B:
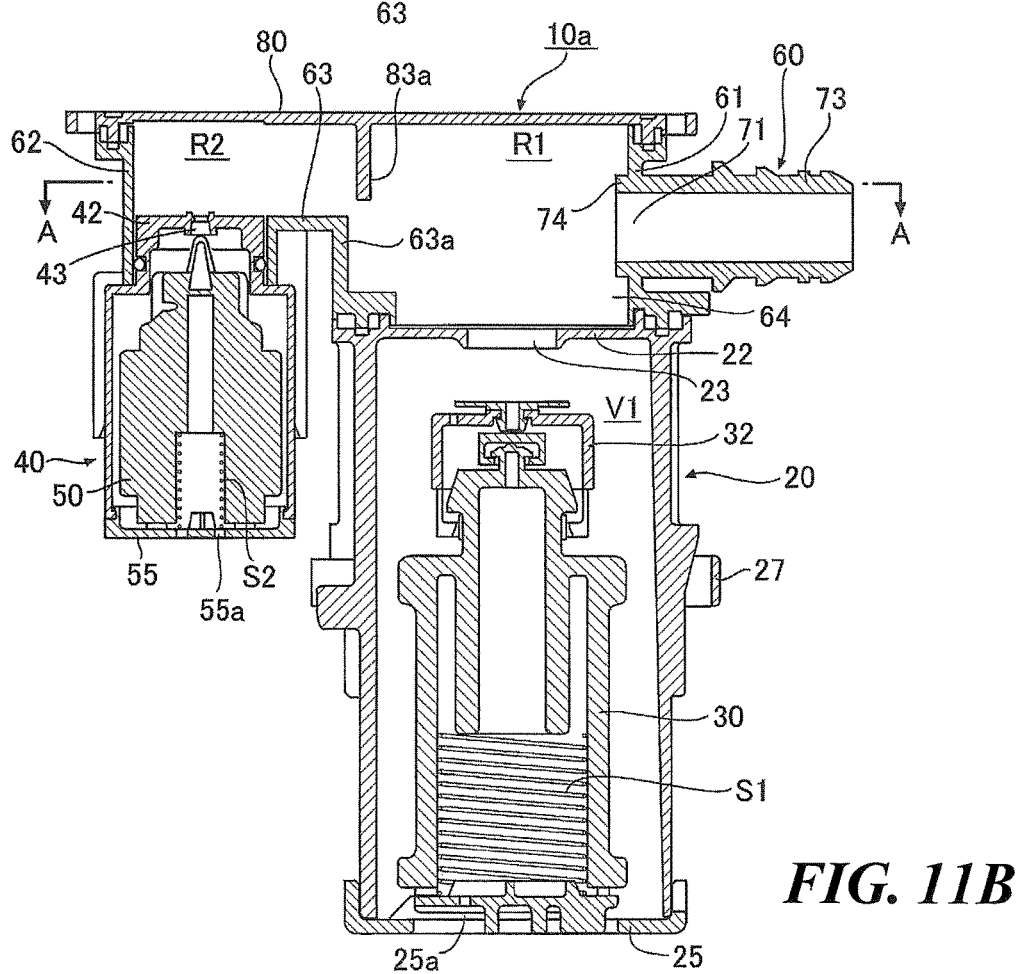
Figure 12:
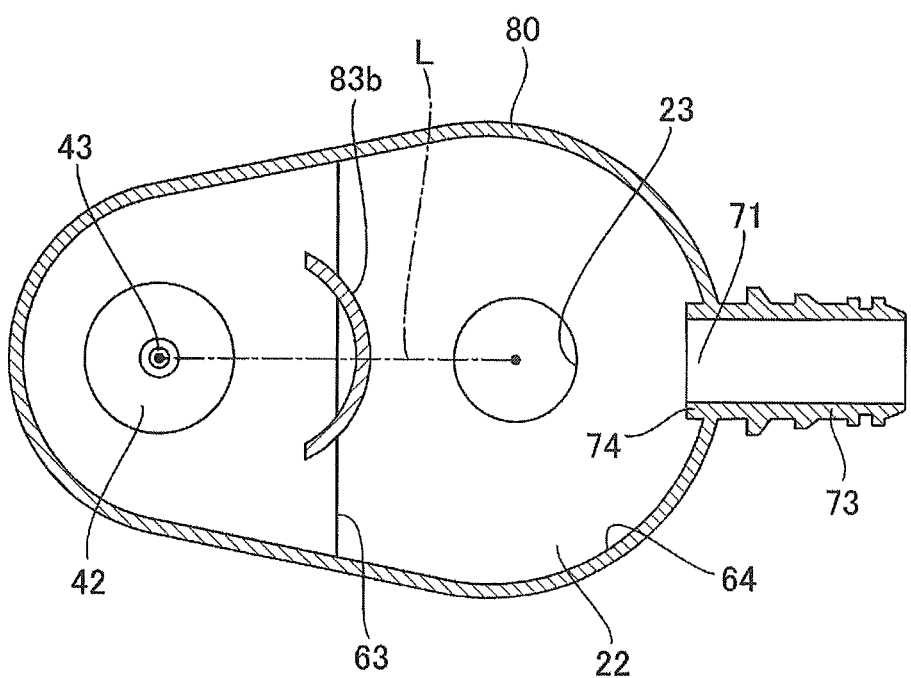
FIG. 12 is an explanatory view of another shape of a rib.

FIGS. 11 and 12 are views of a valve device for fuel tank according to the second embodiment. Substantially same components as the ones in the above-described embodiment are provided with same reference numerals, and descriptions of the same components are omitted.

The valve device 10a for fuel tank (valve device 10a) according to the present embodiment is different in the angle at which the pipe 73 is connected from the above-described embodiment. To be specific, as shown in FIG. 11A, in a plan view, the pipe 73 is connected with the outer periphery of the first cylinder portion 61 of the cover 60 so as to be an extension of the pathway L heading from the second opening 43 to the first opening 23.

In the present embodiment, the check valve 56 according to the above-described embodiment is not provided, and the second partition wall 42 having the second opening 43 is disposed so as to be same in height as the shelf-shaped wall portion 63, and the clearance between the second partition wall 42 and the shelf-shaped wall portion 63 and the ceiling wall 80 is larger than the above-described embodiment, which forms the second ventilation chamber R2 larger in capacity.

The rib 83a provided on the pathway L heading from the second opening 43 to the first opening 23 has a long plate shape extending linearly along the width direction of the ceiling wall 80 and is disposed in a direction perpendicular to the pathway L on the inner surface of the ceiling wall 80 on the side of the recess portion 64 around the first opening 23. The rib 83a is disposed at a position close to a vertical wall 63a of the shelf-shaped wall portion 63 (see FIG. 11B). The rib may be a rib 83b having a long plate shape curved into an arc shape as shown in FIG. 12, and is not limited specifically.

In the present embodiment, the rib 83a can block the fuel flowing out of the second opening 43 into the second ventilation chamber R2 to flow toward the first opening 23 from heading to the discharge outlet 71, which can make the fuel fall into the recess portion 64, and thereby the fuel can be made not to easily flow into the discharge outlet 71.

Third Embodiment

FIG. 13 is a view of a valve device for fuel tank according to the third embodiment. Substantially same components as the ones in the above-described embodiment are provided with same reference numerals, and descriptions of the same components are omitted.

The valve device 10b for fuel tank (valve device 10b) according to the present embodiment has the first partition wall 22, the second partition wall 42, and a wall portion 63b between the first partition wall 22 and the second partition wall 42 are disposed at the same height, and the first opening 23 and the second opening 43 are disposed accordingly at the same height. The rib 83a having a long plate shape is disposed at an approximately midpoint between the second opening 43 and the first opening 23 in a direction perpendicular to the pathway L. The present rib may be the rib 83b shown in FIG. 12, and is not limited specifically.

Also in the present embodiment, the rib 83a can block the fuel flowing out of the second opening 43 into the second ventilation chamber R2 to flow toward the first opening 23 from heading to the discharge outlet 71, and thereby the fuel can be made not to easily flow into the discharge outlet 71.

Fourth Embodiment

FIGS. 14 to 23 are views of a valve device for fuel tank according to the fourth embodiment. Substantially same components as the ones in the above-described embodiment are provided with same reference numerals, and descriptions of the same components are omitted.

The valve device 10c for fuel tank (valve device 10c) according to the present embodiment is different mainly in the shape of a cover 60B from the above-described embodiments, and the shapes of a first casing 20B, second casing 40B, and a ceiling wall 80B are accordingly different.

Descriptions of the first casing 20B and the second casing 40B will be provided first. To be specific, the first casing 20B includes an annular flange 24 protruding from the outer circumference of the first partition wall 22, and an annular wall 24a protruding from the outer circumference of the flange 24 (see FIG. 14).

Figure 19:
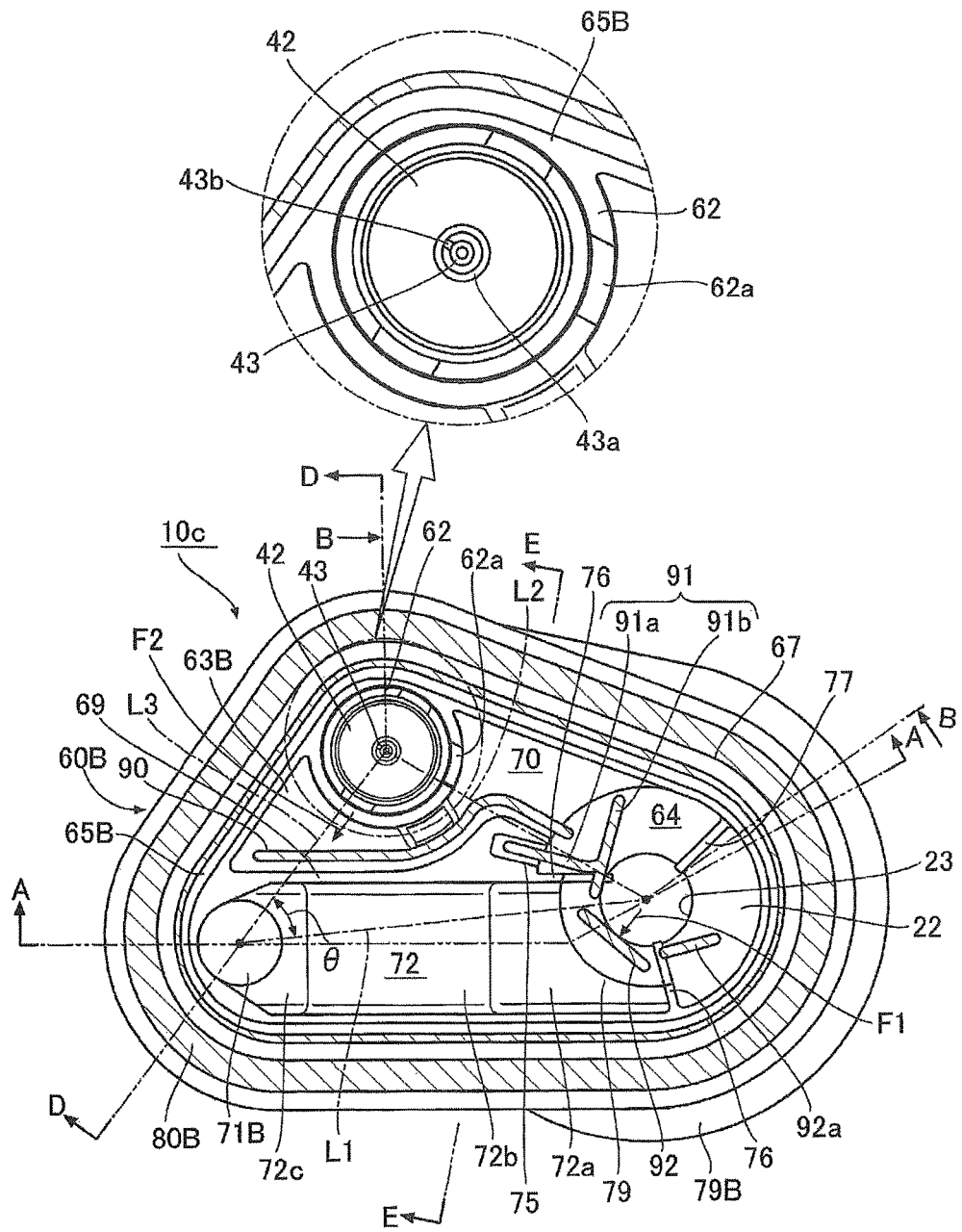
FIG. 19 is a plan view of the ceiling wall, a portion of which is broken.

As shown in FIG. 19, a notch 43b of the second opening 43 of the second casing 40 that is provided to a cylindrical protruding portion 43a is disposed opposite to a notch 62a (described later) of the second cylinder portion 62 that is oriented toward the first opening 23. Holding frames 46 having an approximately U shape are provided below the engagement pawls 44 protruding from the peripheral wall 41 of the second casing 40B.

Figure 16A:
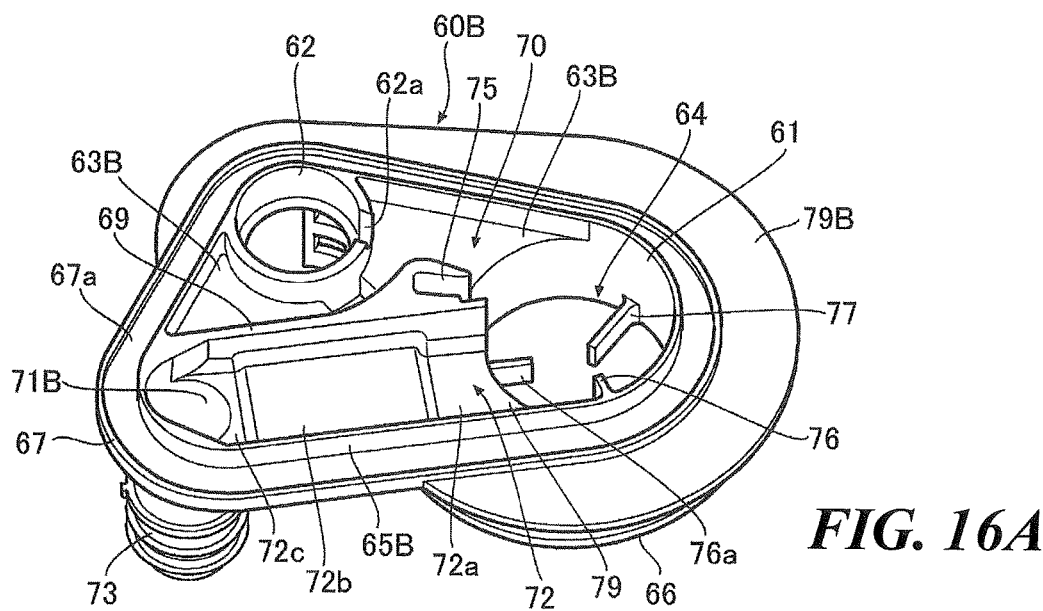
FIGS. 16A and 16B are views of a cover, where

As shown in FIG. 16A, the cover 60B according to the present embodiment includes a shelf-shaped wall portion 63B, an outer wall 65B having a frame shape standing from the circumference of the shelf-shaped wall portion 63B, and thus the cover 60B has an open-topped thin box shape with the wall portions on the lower side and the outer periphery. A welding groove 67a for welding with the ceiling wall 80B is provided around the outer wall 65B. An annular wall 67 lower than the outer wall 65B is provided around the outer wall 65B via the welding groove 67a.

In a state where the ceiling wall 80B is attached to the upper side of the cover 60B as shown in FIGS. 20 to 23, the predetermined clearance R3 is provided between the outer wall 65B and the inner surface of the ceiling wall 80 (i.e., a ceiling surface of the ventilation chamber, the same hereinafter). The outer wall 65B is disposed so as to surround the first valve chamber V1 to house the first float valve 30, the second valve chamber V2 to house the second float valve 50, and a third opening 71B.

As shown in FIG. 19, in a plan view, the shelf-shaped wall portion 63B has an approximately triangular shape of which each vertex is round and has an arc shape.

The first cylinder portion 61 having an approximately cylindrical shape extends downward from one of the vertexes of the approximately triangle-shaped shelf-shaped wall portion 63B so as to be disposed around the first opening 23 as shown in FIGS. 16A and 16B, 20, and 21. The first cylinder portion 61 opens in a direction perpendicular to the shelf-shaped wall portion 63B such that the lower portion of the first cylinder portion 61 can be visibly recognized in a plan view.

Figure 20:
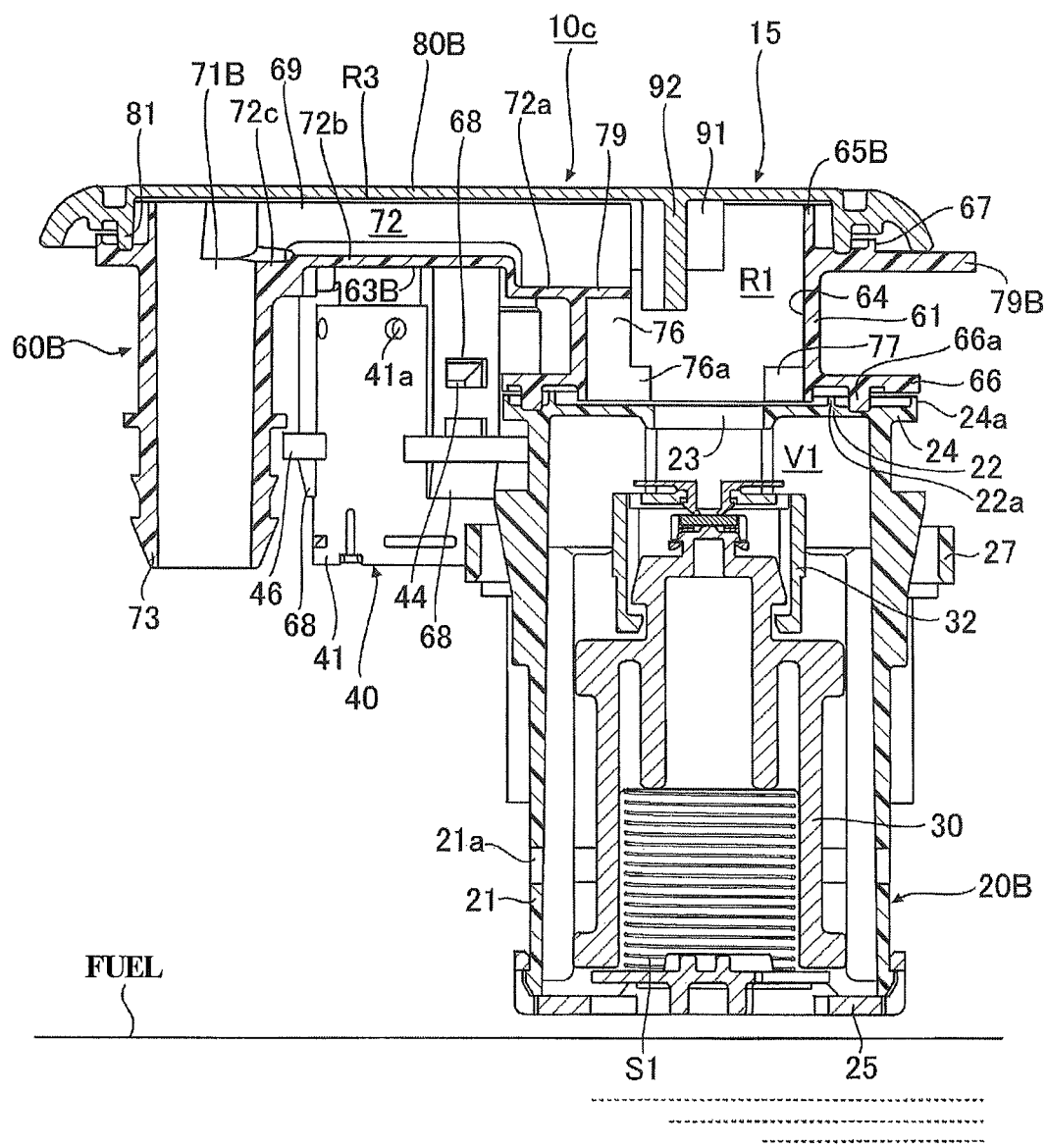
FIG. 20 is a cross-sectional view taken along the line A-A of FIG. 19.
Figure 21:
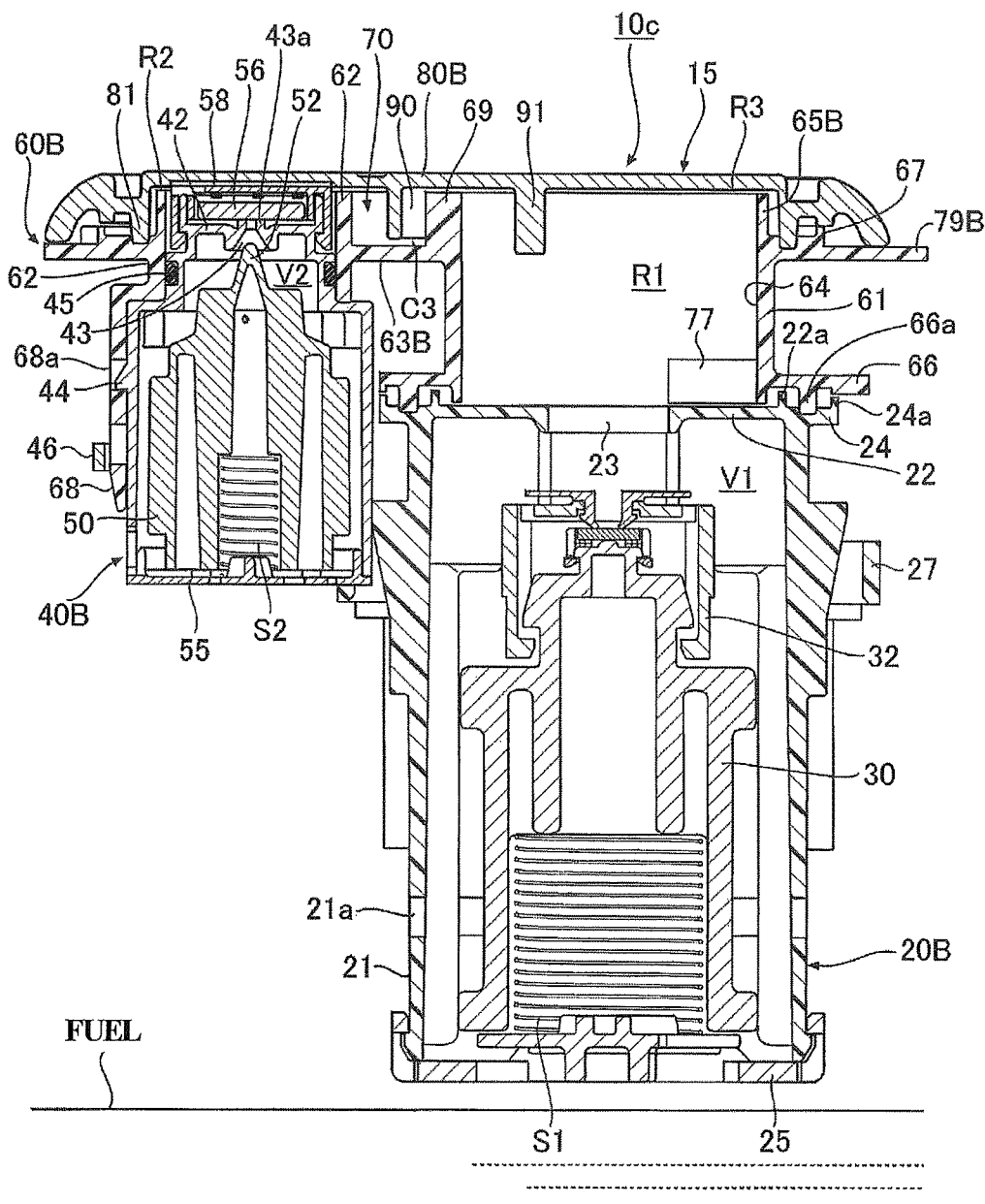
FIG. 21 is a cross-sectional view taken along the line B-B of FIG. 19.

By placing the welding protruding portion 66a on the back side of the flange portion 66 of the first cylinder portion 61 on the outside diameter side of the annular wall 22a of the first partition wall 22 of the first casing 20B and on the inside diameter side of the annular wall 24a of the flange 24 as shown in FIGS. 20 and 21, and welding the annular welding protruding portion 66a to the upper surface of the first partition wall 22 at the position, the first casing 20B can be connected with the cover 60B.

Consequently, the first partition wall 22 of the first casing 20B is disposed at the opening of the first cylinder portion 61 on the lower side, and the first opening 23 is disposed at the center of the first cylinder portion 61. As shown in FIG. 19, in a plan view, the first opening 23 is disposed at one of the vertexes of the triangle of the cover 60B via the first cylinder portion 61.

The second cylinder portion 62 having a cylindrical shape is provided at another vertex of the approximately triangle-shaped shelf-shaped wall portion 63B so as to be disposed around the second opening 43 as shown in FIGS. 16A, 16B, 18, 19, and 21. The second cylinder portion 62 protrudes upward at the same height as the outer wall 65B from the upper surface of the shelf-shaped wall portion 63B (the surface on the ceiling wall 80) so as to provide the predetermined clearance R3 between the second cylinder portion 62 and the ceiling surface of the ceiling wall 80 while protruding downward a predetermined length from the lower surface of the shelf-shaped wall portion 63B (the surface on the side of the first casing 20B and the second casing 40B). The second cylinder portion 62 opens in a direction perpendicular to the shelf-shaped wall portion 63B such that the lower portion of the second cylinder portion 62 can be visibly recognized in a plan view.

Figure 18:
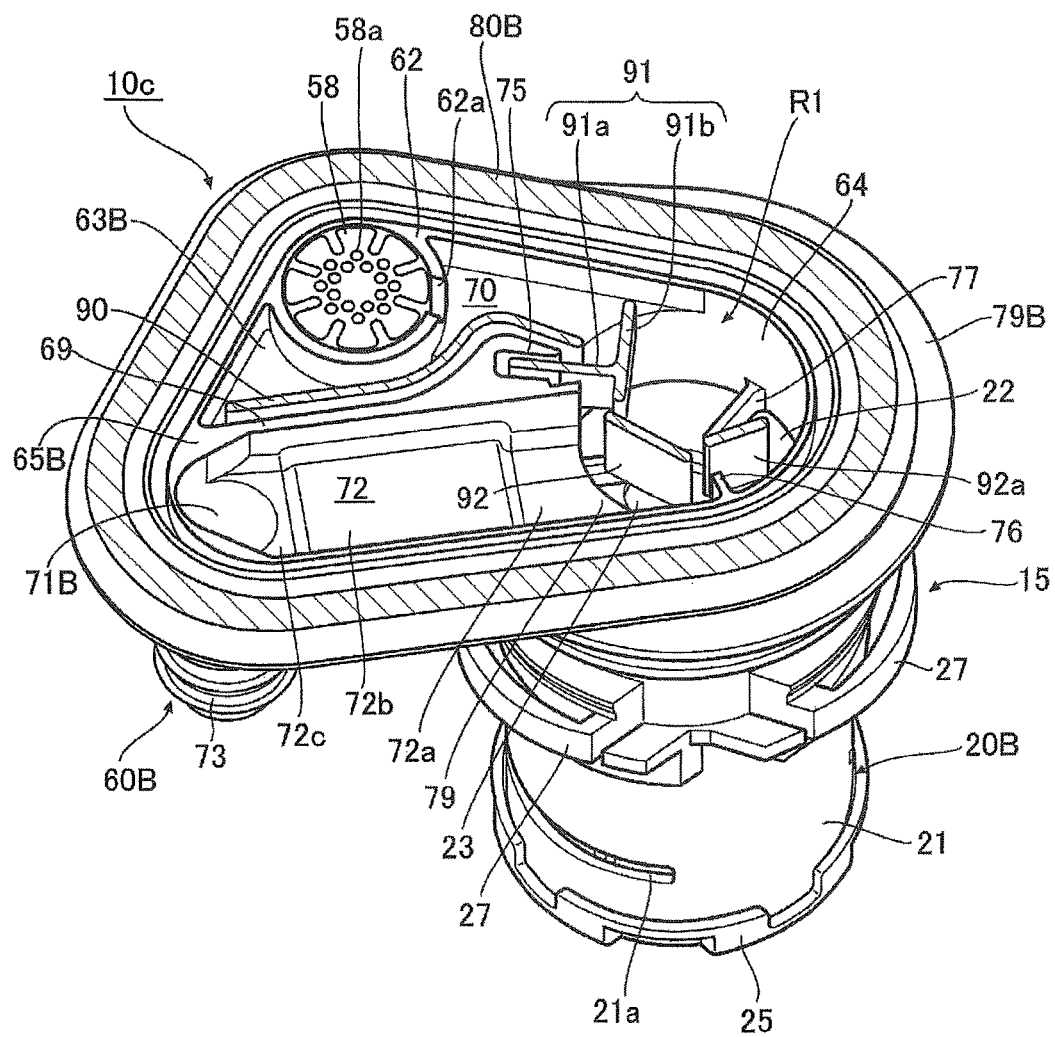
FIG. 18 is a perspective view of the ceiling wall, a portion of which is broken.

As shown in FIGS. 16A, 18, and 19, the notch 62a communicating with the ventilation chamber is provided on the periphery of the upper portion for the second cylinder portion 62 on the side of the first opening 23. The notch 62a is disposed opposite to the notch 43b provided to the protruding portion above the second opening 43 (see FIG. 19).

Figure 16B:
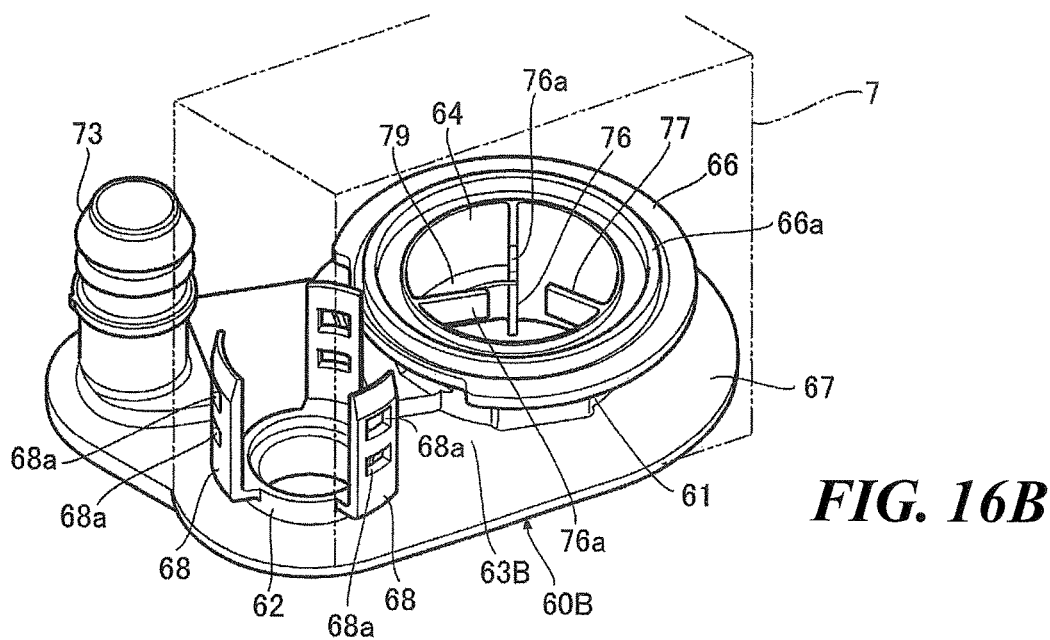

In the present embodiment, a pair of engagement holes 68a and 68a are provided in the up/down direction of each of the engagement pieces 68 as shown in FIG. 16B. By inserting the reduced-diameter upper portion of the peripheral wall 41 of the second casing 40B into the inner periphery of the downward-protruding portion of the second cylinder portion 62, the engagement pawls 44 of the second casing 40B engage the engagement holes 68a and 68a of the engagement pieces 68 one by one. Because the engagement pawls 44 engage the engagement holes 68a disposed above, the second casing 40B is airtightly connected with the cover 60B via the sealing ring 45 (see FIGS. 21 and 22). The distal ends of the engagement pieces 68 are inserted into the holding frames 46 provided to the peripheral wall 41 of the second casing 40B and prevented from expanding (see FIG. 15).

The second partition wall 42 of the second casing 40B is disposed at the opening of the second cylinder portion 62 on the lower side, and the second opening 43 is disposed at the center of the second cylinder portion 62. As shown in FIG. 19, in a plan view, the second opening 43 is disposed at one of the vertexes of the triangle of the cover 60B via the second cylinder portion 62.

The third opening 71B having a circular hole shape and functioning as a fuel vapor discharge outlet is provided at the other vertex of the triangle-shaped shelf-shaped wall portion 63B as shown in FIGS. 16A, 18, and 19. The third opening 71B is open in a direction perpendicular to the shelf-shaped wall portion 63B. As shown in FIG. 19, in a plan view, the third opening 71B is disposed at a position on the shelf-shaped wall portion 63B apart from the recess portion 64 where the first opening 23 is disposed.

The pipe 73 extends from the circumference on the lower surface of the shelf-shaped wall portion 63B toward the lower portion of the housing 15 as shown in FIGS. 16A, 16B, and 20.

As described above, in the valve device 10c according to the present embodiment, the first opening 23, the second opening 43, and the third opening 71B are disposed at the vertexes of the triangle of the approximately triangle-shaped shelf-shaped wall portion 63B in a plan view (see FIG. 19).

As shown in FIG. 19, in a plan view, let L1 represent the line connecting the center of the first opening 23 with the center of the third opening 71B, let L2 represent the line connecting the center of the first opening 23 with the center of the second opening 43, and let L3 represent the line connecting the center of the second opening 43 with the center of the third opening 71B. In the present embodiment, the angle θ that the line L1 forms with the line L3 is made acute in a plan view. In the present embodiment, the angle that the line L1 forms with the line L2 is also made acute, and the angle that the line L2 forms with the line L3 is approximately square.

As shown in FIGS. 16A, 18, and 19, a barrier 69 having a height of not being in contact with the ceiling surface of the ceiling wall 80 is provided on the line L3 connecting the second opening 43 with the third opening 71B so as to stand from the bottom surface of the ventilation chamber (the upper surface of the shelf-shaped wall portion 63B) such that the clearance R3 above in the height direction of the ventilation chamber (see FIGS. 20 to 23) is made narrow.

The barrier 69 has the shape of extending toward the first opening 23 such that its one end is connected with the wall surface of the outer wall 65B between the second cylinder portion 62 and the third opening 71B while its other end reaches the inner periphery of the recess portion 64. The barrier 69 has a curved jutting shape such that the distance with the cylindrical second cylinder portion 62 is approximately constant at a position closer to the recess portion 64 than its middle portion. The rib insertion groove 75 having a concave groove shape is provided to the other end of the barrier 69 so as to communicate with the clearance R3 constituting the recess portion 64 and the ventilation chamber. The barrier 69 according to the present embodiment has a shape like an adjustable wrench in a plan view; however, the shape of the barrier 69 is not limited specifically if the barrier 69 is disposed on the line L3 connecting the second opening 43 with the third opening 71B.

Figure 22:
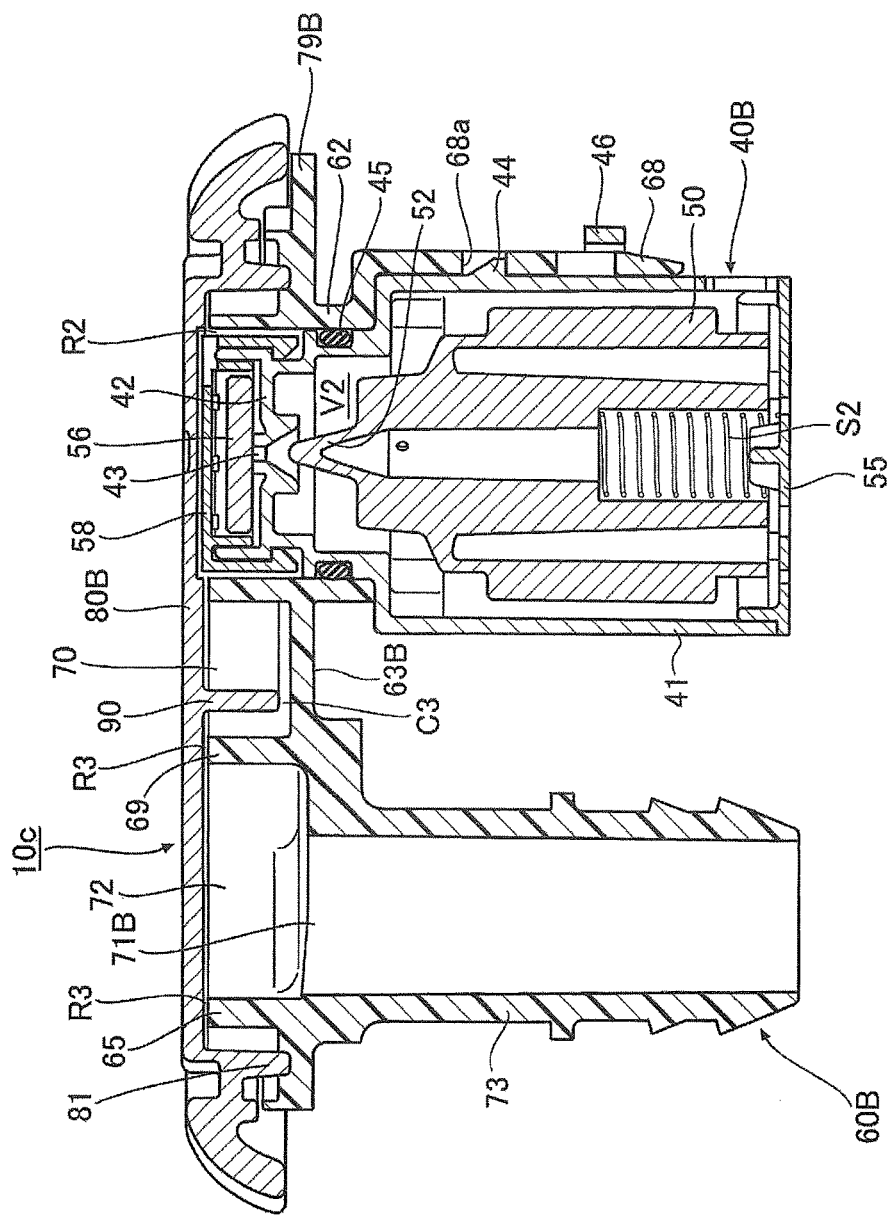
FIG. 22 is a cross-sectional view taken along the line D-D of FIG. 19.
Figure 23:
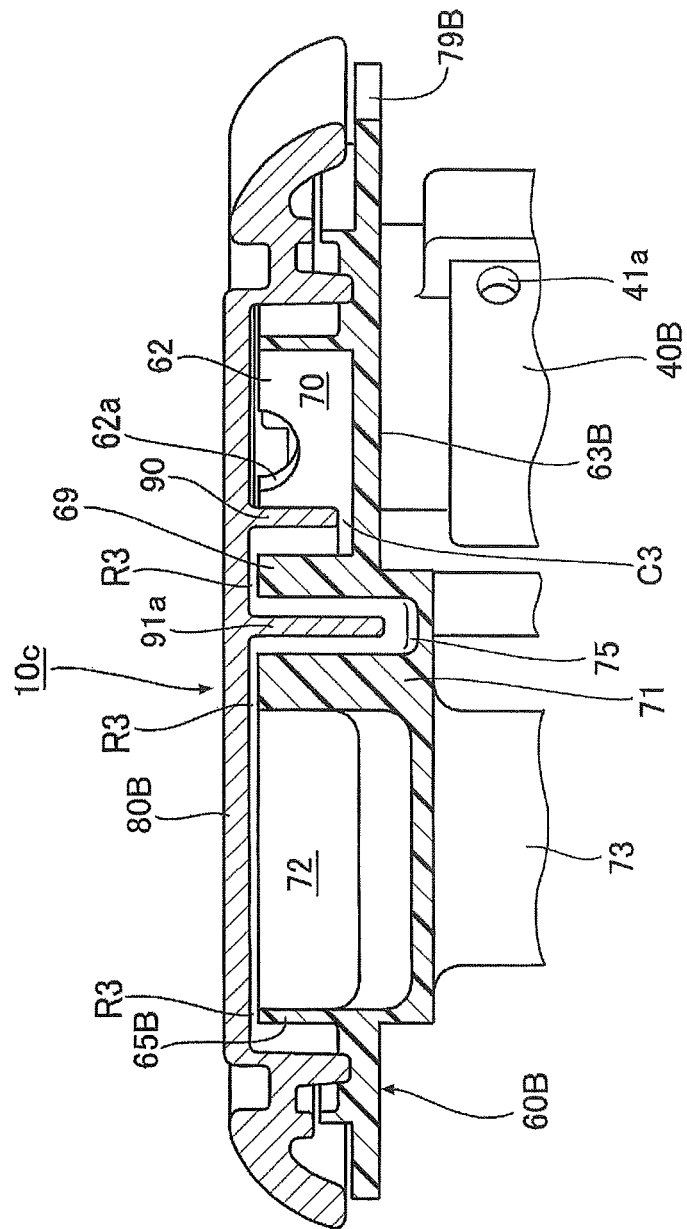
FIG. 23 is a cross-sectional view taken along the line E-E of FIG. 19.

As shown in FIGS. 16A, 18, and 19, the groove portion 70 that extends from the second opening 43 so as to communicate with the recess portion 64 while having the barrier 69 as a border and reaches the first opening 23, and a passage 72 (functioning as the "passage") that extends from the first opening 23 to the third opening 71B so as to communicate the recess portion 64 with the third opening 71B are provided between the cover 60B and the ceiling wall 80B. The groove portion 70 and the passage 72 are disposed approximately along the line L2 and the line L1. As shown in FIGS. 22 and 23, the bottom surfaces of the groove portion 70 and the passage 72 (the upper surface of the shelf-shaped wall portion 63B) are lower than the upper end surface of the barrier 69.

Plural bottom surfaces different in height are provided on the bottom surface of the passage 72, i.e., on the upper surface of the shelf-shaped wall portion 63B where the passage 72 is provided. To be specific, as shown in FIGS. 16A, 18, and 20, the bottom surface of the passage 72 includes a first bottom surface 72a that is disposed on the side of the first opening 23, a second bottom surface 72b that is connected with the first bottom surface 72a to be disposed on the side of the third opening 71B and higher than the first bottom surface 72a, and a third bottom surface 72c that is connected with the second bottom surface 72b, lower than the second bottom surface 72b and higher than the first bottom surface 72a, and includes the third opening 71B.

As shown in FIGS. 16B, 19, and 20, an eaves-like wall portion 79 protruding in the inner diameter direction of the recess portion 64 is provided at the end of the wall surface that forms the passage 72 on the side of the recess portion 64. The eaves-like wall portion 79 has an arc rib shape and a predetermined width, and is disposed along the circumferential direction of the recess portion 64. In addition as shown in FIGS. 16B, 19, and 20, the pair of vertical ribs 76 and 76 protrude in the inner diameter direction of the recess portion 64 on both the sides of the eaves-like wall portion 79 in the circumferential direction (the width direction).

As shown in FIGS. 16A, 18, and 19, a flange portion 79B protruding in the outside diameter direction over the outer wall 65B surrounding the first valve chamber V1 and the second valve chamber V2 is provided on the outer circumference of the ventilation chamber. The flange portion 79B according to the present embodiment juts a predetermined length in the outside diameter direction from the outer circumference of the annular wall 67 provided further outer than the outer wall 65B as shown in FIG. 16A.

By providing the flange portion 79B, the first cylinder portion 61 and the second cylinder portion 62 can be surrounded by the wall portion 7 indicated with virtual lines as shown in FIG. 16B, and eventually the entire first casing 20B including the first valve chamber V1 communicating with the first cylinder portion 61 and the entire second casing 40B including the second valve chamber V2 communicating with the second cylinder portion 62 can be surrounded by the wall portion 7.

Figure 14:
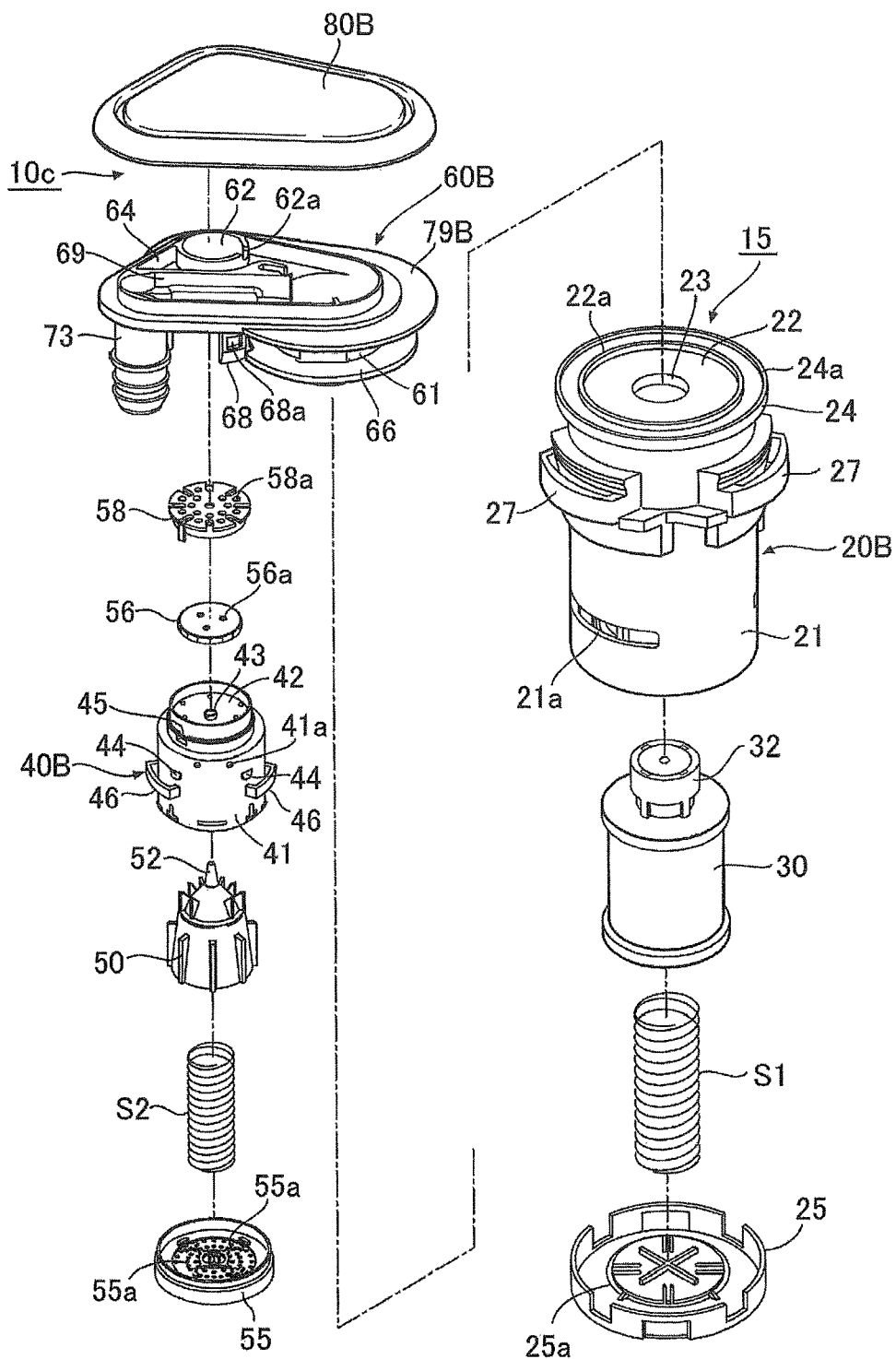
FIG. 14 an exploded perspective view of a valve device for fuel tank according to the fourth embodiment.
Figure 15:
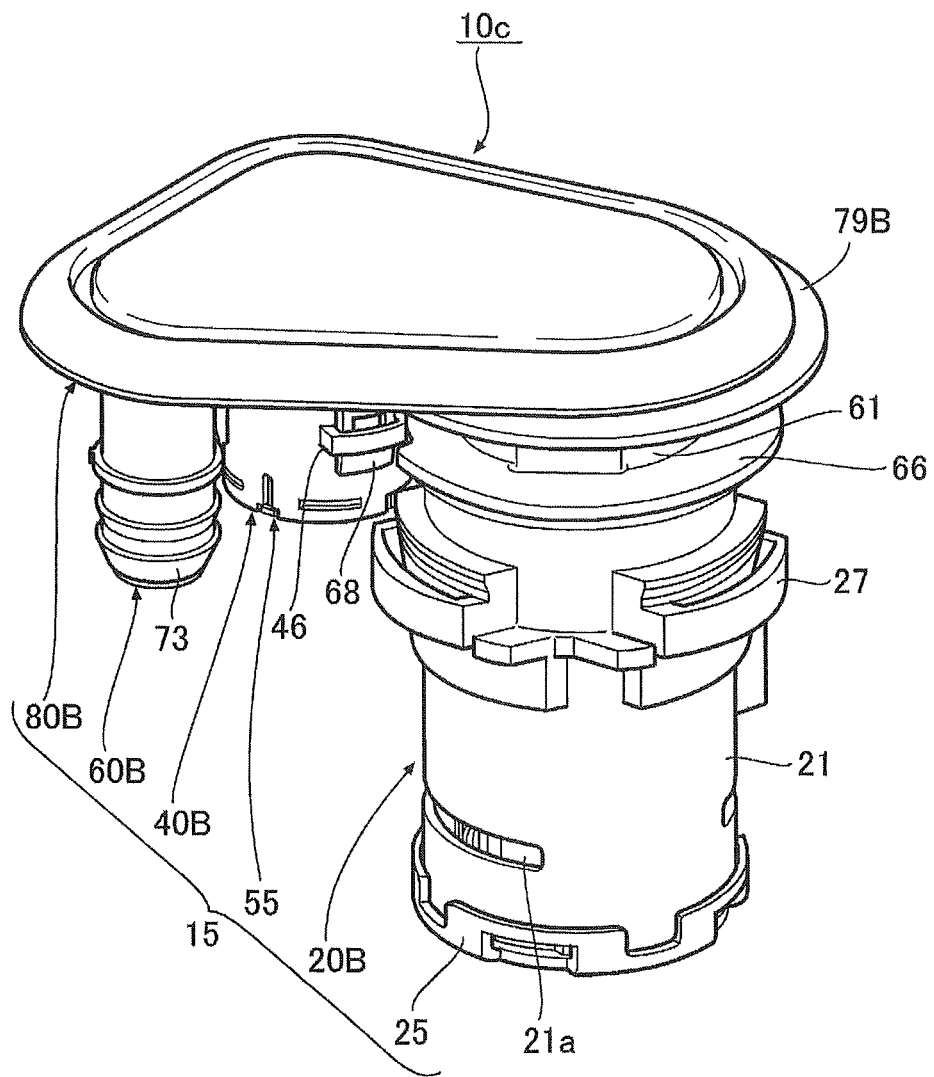
FIG. 15 is a perspective view of the valve device.
Figure 17:
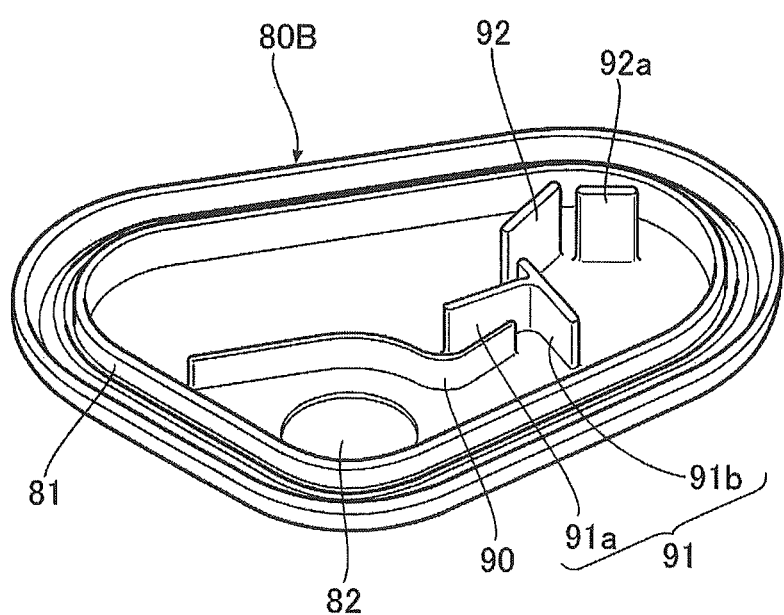
FIG. 17 is a perspective view of a ceiling wall.

The ceiling wall 80B attached to the upper side of the cover 60B described above has an approximately triangular plate shape of which each vertex is round and has an arc shape so as to conform to the upper opening of the approximately-triangular cover 60B as shown in FIGS. 14 and 17. The outer periphery of the ceiling wall 80B has a shape of gently bending downward.

In the valve device 10c, a first wall portion 92 extending from the ceiling wall inner surface of the ventilation chamber is provided to the circumference at the end of the passage 72, which extends so as to communicate the recess portion 64 with the third opening 71B, on the side of the recess portion 64 so as to block the fuel flowing out of the second opening 43 into the first opening 23 from heading to the third opening 71B (see the arrow F1 in FIG. 19) as shown in FIGS. 18 and 19.

As shown in FIGS. 17 to 20, the first wall portion 92 is disposed on the inner side of the recess portion 64 than the opening of the passage 72 on the side of the first opening 23, and suspended from the ceiling wall inner surface of the ventilation chamber, i.e., the inner surface of the ceiling wall 80B so as to be able to cover the opening in a predetermined range.

As shown in FIGS. 17 and 18, the first wall portion 92 according to the present embodiment has a long plate shape and a rectangular cross section while extending longer than a second wall portion 90 and a guide rib 91 (first partition portion) to be described later, and is disposed at a position close to the inner surface of the eaves-like wall portion 79 as shown in FIG. 19. Preferably, the first wall portion 92 is formed to have a shape, or be disposed at a position such that the first wall portion 92 is capable of blocking the fuel from heading to the third opening 71B, and for example, the first wall portion 92 may have a plate shape and an arc cross section so as to conform to the arc shape of the eaves-like wall portion 79.

In addition to the first wall portion 92, an auxiliary wall portion 92a for preventing the fuel flowing out of the second opening 43 into the first opening 23 from heading to the third opening 71B is provided at a position adjacent to the first wall portion 92 so as to be suspended from the inner surface of the ceiling wall 80B. The auxiliary wall portion 92a extends longer than the second wall portion 90 and the guide rib 91 to be described later similarly to the first wall portion 92.

In the valve device 10c, the second wall portion 90 extending from the ceiling wall inner surface of the ventilation chamber is provided between the second opening 43 and the third opening 71B such that the fuel flowing out of the second opening 43 is blocked from heading to the third opening 71B (see the arrow F2 in FIG. 19) as shown in FIGS. 18 and 19.

As shown in FIGS. 17 to 19, the second wall portion 90 is suspended from the ceiling wall inner surface of the ventilation chamber (the inner surface of the ceiling wall 80B) while having a predetermined clearance C3 (see FIGS. 21 and 22) in the space with the bottom surface of the ventilation chamber (the upper surface of the shelf-shaped wall portion 63B), and disposed on the line L3 connecting the second opening 43 with the third opening 71B so as to be adjacent to the barrier 69 of the cover 60B leaving a predetermined space with the barrier 69.

The second wall portion 90 according to the present embodiment has its one end disposed close to the wall surface of the outer wall 65B of the cover 60B between the second cylinder portion 62 and the third opening 71B so as to correspond to the barrier 69 while extending linearly along the barrier 69. A portion of the second wall portion 90, the portion being slightly closer to the other end than the middle portion of the second wall portion 90, has a bent shape gently-curved toward the second cylinder portion 62 so as to comfort to the curved jutting portion of the barrier 69 and the outer surface of the second cylinder portion 62. The other end of the second wall portion 90 is folded and extends approximately linearly toward the recess portion 64 along the line L2 connecting the first opening 23 with the second opening 43, and the extreme tip portion of the second wall portion 90 is disposed so as to protrude toward the inner diameter side over the inner periphery of the recess portion 64. The second wall portion 90 is adjacent to the barrier 69 keeping an approximately constant space with the barrier 69 (see FIG. 19). The second wall portion 90 stands shorter than the first wall portion 92 and the guide rib 91 to be described later.

The second wall portion 90 having the above-described shape and the barrier 69 provided on the cover 60 form a labyrinth structure like a maze where the clearance R3 and the clearance C3 are vertically disposed alternately as shown in FIG. 23.

The guide rib 91 (see FIGS. 18 and 19) for guiding the fuel flowing out of the second opening 43 into the ventilation chamber into the recess portion 64 is suspended from a position adjacent to the second wall portion 90 on the inner surface of the ceiling wall 80B.

As shown in FIGS. 17 to 19, the guide rib 91 is disposed so as to be superposed a predetermined length upon the other end of the second wall portion 90, and includes a first rib 91a to be inserted into the rib insertion groove 75 of the cover 60B, and a second rib 91b that is formed at a right angle with the first rib 91a, disposed on the inner side of the recess portion 64 than the opening of the groove portion 70 on the side of the first opening 23 on the line L2 connecting the first opening 23 with the second opening 43, and arranged to cover the opening in a predetermined range. The ribs 91a and 91b stand shorter than the first wall portion 92 and longer than the second wall portion 90. A concave clearance is formed between the first rib 91a and the inner surface of the rib insertion groove 75 at a position where the first rib 91a is inserted to flow into the rib insertion groove 75 as shown in FIG. 23. The guide rib 91 is used for making fuel hit with the first rib 91a and the second rib 91b to easily fall into the recess portion 64 when the fuel flowing out of the notch 62a of the second cylinder portion 62 into the groove portion 70 flows into the recess portion 64.

Next, the operation and effect of the valve device 10c according to the fourth embodiment will be described.

To be specific, because the first wall portion 92 is provided to the circumference at the end of the passage 72 on the side of the recess portion 64 as shown in FIGS. 18 and 19 such that the fuel flowing out of the second opening 43 into the first opening 23 is blocked from heading to the third opening 71B, even if the automobile vibrates, sways, or makes a sharp turn, and the fuel or fuel droplets could vigorously flow into the second ventilation chamber R2 through the second opening 43 to flow into the first ventilation chamber R1 through the clearance R3 on the shelf-shaped wall portion 63, and the fuel flows into the passage 72 as indicated with the arrow F1 in FIG. 19, the first wall portion 92 can block the fuel flow, and can prevent the fuel from flowing into the third opening 71B through the passage 72 to flow into the pipe 73.

In the present embodiment, because the auxiliary wall portion 92a is provided at the position adjacent to the first wall portion 92, even if the fuel detours around one side in the width direction of the first wall portion 92 to flow into the passage 72, the auxiliary wall portion 92a blocks the fuel, which can prevent the fuel from heading to the third opening 71B.

Because the second wall portion 90 is provided between the second opening 43 and the third opening 71B so as to block the fuel flowing out of the second opening 43 from heading to the third opening 71B as shown in FIGS. 18 and 19, even if the fuel flowing out of the second opening 43 into the ventilation chamber flows toward the third opening 71B as indicated with the arrow F2 in FIG. 19, the second wall portion 90 can block the fuel flow, and can prevent the fuel from flowing into the third opening 71B to flow into the pipe 73.

Because the barrier 69 standing from the shelf-shaped wall portion 63B of the cover 60B is provided at the position adjacent to the second wall portion 90, it is possible to more effectively prevent the fuel from flowing toward the third opening 71B.

The invention claimed is:

1. A valve device for a fuel tank, the valve device including:
   a housing in which a lower-side valve chamber and an upper-side ventilation chamber are divided by a partition wall, the housing including a first opening and a second opening through which the valve chamber and the ventilation chamber are communicated, respectively;
   a fuel vapor discharge outlet provided to communicate with the ventilation chamber;
   a first float valve vertically movably housed in the valve chamber to close the first opening when a fuel level in the fuel tank approaches a full fuel level;
   a second float valve vertically movably housed in the valve chamber to close the second opening based on the fuel level in the fuel tank; and
   a recess portion defined in a part of the ventilation chamber such that the partition wall including the first opening is provided on a bottom portion of the recess portion,
   wherein a third opening functioning as the fuel vapor discharge outlet is positioned to communicate with the recess portion,
   wherein a passage extending from the second opening to the third opening through the first opening is provided,
   wherein a first partition portion extends from a ceiling wall inner surface of the ventilation chamber in the passage so as to block the fuel that flows out of the second opening into the first opening of the recess portion from heading to the third opening,
   wherein, in a plan view, the first partition portion has a shape extending from a side of the second opening toward the first opening in a direction away from the third opening,
   wherein the first partition portion includes a first rib and a second rib intersecting, with an angle with respect to the first rib,
   wherein, in the plan view, the second rib is disposed between the first opening and the second opening so as to intersect with another passage formed between the second opening and the first opening, and the first rib extends from the second rib toward the side of the second opening, and wherein a groove, into which the first rib extends in the plan view, is formed at the partition wall between the first opening and the second opening.

2. The valve device of claim 1, wherein a second partition portion extends from the ceiling wall inner surface of the ventilation chamber and has a shape extending from a side of the third opening toward the first opening so as to block the fuel that flows out of the second opening from heading to the third opening.

3. The valve device of claim 2, wherein, in the plan view, the second partition portion is located outside an area between the first opening and the third opening.

4. The valve device of claim 2, wherein, in the plan view, the second partition portion is located outside an entire area between the first opening and the third opening.

5. The valve device of claim 1, wherein, in a cross-sectional view, the first opening, the second opening, and the third opening are sequentially placed across the valve device.

6. The valve device of claim 1, wherein the first rib comprises a tip end side and a root side, the tip end side of the first rib being disposed inside of the groove and the root side of the first rib being disposed inside a concave portion in the plan view.

7. The valve device of claim 1, wherein a distal end of the first rib is spaced apart from an inner surface of the groove.

8. The valve device of claim 1, wherein a height of the first rib decreases as the first rib longitudinally extends from the second rib to the groove.

9. A valve device for a fuel tank, the valve device including:
a housing in which a lower-side valve chamber and an upper-side ventilation chamber are divided by a partition wall, the housing including a first opening and a second opening through which the valve chamber and the ventilation chamber are communicated, respectively;
a fuel vapor discharge outlet provided to the ventilation chamber;
a first float valve vertically movably housed in the valve chamber to close the first opening when the fuel level in a fuel tank approaches a full fuel level; and
a second float valve vertically movably housed in the valve chamber to close the second opening based on the fuel level in the fuel tank,
wherein a partition portion extends from a ceiling wall inner surface of the ventilation chamber on a pathway heading from the second opening to the first opening so as to block the fuel that flows out of the second opening from heading to the fuel vapor discharge outlet,
wherein, in a plan view, the partition portion has a shape extending from a side of the second opening toward the first opening in a direction away from the fuel vapor discharge outlet,
wherein the partition portion includes a first rib and a second rib intersecting, with an angle with respect to the first rib,
wherein, in the plan view, the second rib is disposed between the first opening and the second opening so as to intersect with a passage formed between the second opening and the first opening, and the first rib extends from the second rib toward the side of the second opening, and
wherein a groove, into which the first rib extends in the plan view, is formed at the partition wall between the first opening and the second opening.

10. The valve device of claim 9, wherein the first opening defines a recess portion at a position lower than a lowest position of the second opening, and
wherein the partition portion is provided within an upper portion of the recess.

11. The valve device of claim 10, wherein the partition wall includes a shelf-shaped wall portion which extends from a periphery of the second opening to the recess portion, and the shelf-shaped wall portion includes a groove portion which extends from a side of the second opening to a side of the recess portion, and
wherein the partition portion is ranging from a part of the ceiling wall inner surface corresponding to the shelf-shaped wall portion to another part of the ceiling wall inner surface corresponding to the recess portion so as to pass through between the fuel vapor discharge outlet and the groove portion on a part of the ceiling wall inner surface corresponding to the shelf-shaped wall portion.

12. The valve device of claim 11, wherein the groove is formed to receive the partition portion between the groove portion and the fuel vapor discharge outlet.

13. The valve device of claim 9, wherein the pathway is defined to connect a center of the second opening and a center of the first opening, and the fuel vapor discharge outlet is provided on an inner periphery of the ventilation chamber at one side of the pathway in a plan view, and
wherein the partition portion goes away from the fuel vapor discharge outlet as it heads from the second opening to the first opening.

14. The valve device of claim 9, further comprising:
another partition portion located between the second opening and the vapor discharge outlet to block the fuel that flows out of the second opening from heading to the vapor discharge outlet.

15. The valve device of claim 14, wherein, in the plan view, said another partition portion is located outside an area between the first opening and the vapor discharge outlet.

16. The valve device of claim 14, wherein, in the plan view, said another partition portion is located outside an entire area between the first opening and the vapor discharge outlet.

17. A valve device for a fuel tank, the valve device including:
a housing in which a lower-side valve chamber and an upper-side ventilation chamber are divided by a partition wall, the housing including a first opening and a second opening through which the valve chamber and the ventilation chamber are communicated, respectively;
a fuel vapor discharge outlet provided to the ventilation chamber,
a first float valve vertically movably housed in the valve chamber to close the first opening when the fuel level in the fuel tank approaches a full fuel level; and
a second float valve vertically movably housed in the valve chamber to close the second opening based on the fuel level in the fuel tank,
wherein a partition portion extends in the ventilation chamber to block the fuel that flows out of the second opening from heading to the fuel vapor discharge outlet,
wherein, in a plan view, the partition portion has a shape extending from a side of the second opening toward the first opening in a direction away from the fuel vapor discharge outlet, wherein the partition portion includes a first rib and a second rib intersecting, with an angle with respect to the first rib, wherein, in the plan view, the second rib is disposed between the first opening and the second opening so as to intersect with a passage formed between the second opening and the first opening, and the first rib extends from the second rib to the side of the second opening, and wherein a groove, into which the first rib extends in the plan view, is formed at the partition wall between the first opening and the second opening.

18. The valve device of claim 17, further comprising:
another partition portion located between the second opening and the vapor discharge outlet to block the fuel that flows out of the second opening from heading to the vapor discharge outlet.

19. The valve device of claim 18, wherein, in the plan view, said another partition portion is located outside an area between the first opening and the vapor discharge outlet.

20. The valve device of claim 18, wherein, in the plan view, said another partition portion is located outside an entire area between the first opening and the vapor discharge outlet.

* * * * *